United States Patent
Jian et al.

(10) Patent No.: US 11,818,079 B2
(45) Date of Patent: Nov. 14, 2023

(54) RECEIVER ADJUSTMENT FOR WIRELESS COMMUNICATION

(71) Applicant: QUALCOMM Incorporated, San Diego, CA (US)

(72) Inventors: Yung-Yih Jian, Campbell, CA (US); Chun-Hao Hsu, San Jose, CA (US); Peter Pui Lok Ang, San Diego, CA (US); Alexei Yurievitch Gorokhov, San Diego, CA (US); Andrew Chen, San Diego, CA (US); Ping Liu, San Diego, CA (US); Fnu Saikrishna Vasudevan, San Diego, CA (US); Arundhathi Rajshekher Swami, San Diego, CA (US); Madhup Chandra, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 17/334,452

(22) Filed: May 28, 2021

(65) Prior Publication Data

US 2022/0385441 A1 Dec. 1, 2022

(51) Int. Cl.
*H04L 5/00* (2006.01)
*H04L 25/02* (2006.01)
(Continued)

(52) U.S. Cl.
CPC ........ *H04L 5/0098* (2013.01); *H04L 25/0226* (2013.01); *H04W 24/08* (2013.01); *H04W 72/23* (2023.01)

(58) Field of Classification Search
CPC .. H04L 5/0098; H04L 25/0226; H04W 24/08; H04W 72/14
(Continued)

(56) References Cited

U.S. PATENT DOCUMENTS

| 2019/0253200 A1* | 8/2019 | Salem | H04W 72/042 |
| 2020/0100178 A1* | 3/2020 | Kim | H04B 7/046 |
| 2022/0174697 A1* | 6/2022 | Jung | H04L 1/08 |

FOREIGN PATENT DOCUMENTS

| WO | WO-2021025362 A1 | 2/2021 |
| WO | WO-2021032541 A1 | 2/2021 |
| WO | WO-2021041833 A1 | 3/2021 |

OTHER PUBLICATIONS

International Search Report and Written Opinion—PCT/US2022/026573—ISA/EPO—dated Jul. 6, 2022 (2103200WO).
(Continued)

*Primary Examiner* — Obaidul Huq
(74) *Attorney, Agent, or Firm* — Holland & Hart LLP/Qualcomm Incorporated

(57) ABSTRACT

Methods, systems, and devices for wireless communications are described. In some examples, a user equipment (UE) may communicate with a base station using multiple receivers and receive an indication from the base station to activate a second bandwidth part of a set of bandwidth parts configured for the UE. In response to the indication, the UE may switch from operating in a first bandwidth part to operating in the second bandwidth part and adjust a quantity of active receivers at the UE based on switching from operating in the first bandwidth part to operating in the second bandwidth part. Additionally or alternatively, the UE may adjust the quantity of active receivers at the UE based on monitoring for downlink grants from the base station.

28 Claims, 15 Drawing Sheets

(51) Int. Cl.
*H04W 24/08* (2009.01)
*H04W 72/23* (2023.01)

(58) Field of Classification Search
USPC .......................................... 370/310, 328, 329
See application file for complete search history.

(56) References Cited

OTHER PUBLICATIONS

Mediatek Inc, "NR UE Power Saving Designs", 3GPP Draft, 3GPP TSG RAN WG1 Meeting #96, R1-1903353, NR UE Power Saving Designs Revfinal, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 23, 2019 (Feb. 23, 2019), XP051601029, 28 Pages, Retrieved from the Internet: URL: http://www.3gpp.org/ftp/tsg%5Fran/WG1%5FRL1/TSGR1%5F96/Docs/R1%2D1903353%2Ezip [Retrieved on Feb. 23, 2019] Sections 2.1, 4, 8.

* cited by examiner

■ BWP Switch Indication 210

■ DL Grant 215

■ Message 220

RECEIVER ADJUSTMENT FOR WIRELESS COMMUNICATION

FIELD OF TECHNOLOGY

The following relates to wireless communications, including receiver adjustment for wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications system may support multiple-input multiple-output (MIMO) communication. To support MIMO communication, a wireless device (e.g., a UE) may include multiple receivers. In some examples, a wireless device may keep a large number of receivers active (e.g., four active receivers) in an effort to increase data throughput and reliability. But, in some situations, keeping a large number of receivers active may result in excess power consumption at the wireless device.

SUMMARY

The described techniques relate to improved methods, systems, devices, and apparatuses that support receiver adjustment for wireless communication. Generally, the described techniques provide for a user equipment (UE) to adjust a number of active receivers based on bandwidth part (BWP) switching. The UE may receive, from a base station, an indication to activate (e.g., switch to) a BWP of a set of BWPs configured for the UE and in response, the UE may increase, decrease, or maintain the number of active receivers at the UE based on characteristics (e.g., bandwidth) of the indicated BWP.

A method for wireless communication at a user equipment (UE) is described. The method may include receiving, from a base station, an activation message for a second BWP of a set of multiple BWPs configured for the UE, switching from operating in a first BWP to operating in the second BWP based on the activation message for the second BWP, and adjusting a quantity of active receivers at the UE based on switching from operating in the first BWP to operating in the second BWP.

An apparatus for wireless communication at a UE is described. The apparatus may include a processor, memory coupled with the processor, and instructions stored in the memory. The instructions may be executable by the processor to cause the apparatus to receive, from a base station, an activation message for a second BWP of a set of multiple BWPs configured for the UE, switch from operating in a first BWP to operating in the second BWP based on the activation message for the second BWP, and adjust a quantity of active receivers at the UE based on switching from operating in the first BWP to operating in the second BWP.

Another apparatus for wireless communication at a UE is described. The apparatus may include means for receiving, from a base station, an activation message for a second BWP of a set of multiple BWPs configured for the UE, means for switching from operating in a first BWP to operating in the second BWP based on the activation message for the second BWP, and means for adjusting a quantity of active receivers at the UE based on switching from operating in the first BWP to operating in the second BWP.

A non-transitory computer-readable medium storing code for wireless communication at a UE is described. The code may include instructions executable by a processor to receive, from a base station, an activation message for a second BWP of a set of multiple BWPs configured for the UE, switch from operating in a first BWP to operating in the second BWP based on the activation message for the second BWP, and adjust a quantity of active receivers at the UE based on switching from operating in the first BWP to operating in the second BWP.

Some examples of the method, apparatuses, and non-transitory computer-readable medium described herein may further include operations, features, means, or instructions for monitoring for one or more downlink grants from the base station while operating in the second BWP, where adjusting the quantity of active receivers at the UE may be based on monitoring for the one or more downlink grants from the base station.

Some examples of the method, apparatuses, and non-transitory computer-readable medium described herein may further include operations, features, means, or instructions for activating a timer based on switching from operating in the first BWP to operating in the second BWP, where monitoring for the one or more downlink grants from the base station may be based on the timer.

In some examples of the method, apparatuses, and non-transitory computer-readable medium described herein, a bandwidth associated with the second BWP may be greater than a threshold and adjusting the quantity of active receivers at the UE may be based on the bandwidth associated with the second BWP being greater than the threshold.

Some examples of the method, apparatuses, and non-transitory computer-readable medium described herein may further include operations, features, means, or instructions for failing to detect one or more downlink grants from the base station while operating in the second BWP, where adjusting the quantity of active receivers at the UE may include operations, features, means, or instructions for decreasing the quantity of active receivers at the UE from a first quantity of active receivers to a second quantity of active receivers based on failing to detect the one or more downlink grants from the base station.

Some examples of the method, apparatuses, and non-transitory computer-readable medium described herein may further include operations, features, means, or instructions for transmitting, to the base station and before decreasing the quantity of active receivers at the UE, signaling based on the second quantity of active receivers.

In some examples of the method, apparatuses, and non-transitory computer-readable medium described herein, transmitting the signaling based on the second quantity of active receivers may include operations, features, means, or instructions for transmitting channel state feedback (CSF), a sounding reference signal (SRS), or both to the base station according to a format associated with the second quantity of active receivers.

Some examples of the method, apparatuses, and non-transitory computer-readable medium described herein may further include operations, features, means, or instructions for activating a timer based on transmitting the signaling, where decreasing the quantity of active receivers at the UE from the first quantity of active receivers to the second quantity of active receivers occurs based on expiration of the timer.

Some examples of the method, apparatuses, and non-transitory computer-readable medium described herein may further include operations, features, means, or instructions for activating a second timer based on whether one or more second downlink grants may be detected during a duration associated with the timer, where decreasing the quantity of active receivers at the UE occurs based on expiration of the timer and the second timer.

Some examples of the method, apparatuses, and non-transitory computer-readable medium described herein may further include operations, features, means, or instructions for detecting one or more second downlink grants from the base station while operating in the second BWP and after decreasing the quantity of active receivers from the first quantity of active receivers to the second quantity of active receivers and increasing the quantity of active receivers at the UE from the second quantity of active receivers to a third quantity of active receivers based on detecting the one or more second downlink grants from the base station.

In some examples of the method, apparatuses, and non-transitory computer-readable medium described herein, adjusting the quantity of active receivers at the UE may include operations, features, means, or instructions for decreasing the quantity of active receivers at the UE from a first quantity of active receivers to a second quantity of active receivers based on the bandwidth associated with the second BWP being below the threshold.

Some examples of the method, apparatuses, and non-transitory computer-readable medium described herein may further include operations, features, means, or instructions for transmitting, to the base station and before decreasing the quantity of active receivers at the UE, signaling based on the second quantity of active receivers.

In some examples of the method, apparatuses, and non-transitory computer-readable medium described herein, transmitting the signaling based on the second quantity of active receivers may include operations, features, means, or instructions for transmitting CSF, an SRS, or both to the base station according to a format associated with the second quantity of active receivers.

Some examples of the method, apparatuses, and non-transitory computer-readable medium described herein may further include operations, features, means, or instructions for activating a timer based on transmitting the signaling, where decreasing the quantity of active receivers from the first quantity of active receivers to the second quantity of active receivers occurs based on expiration of the timer.

Some examples of the method, apparatuses, and non-transitory computer-readable medium described herein may further include operations, features, means, or instructions for activating a second timer based on whether or not one or more second downlink grants may be detected during a duration associated with the timer, where decreasing the quantity of active receivers at the UE occurs based on expiration of the timer and the second timer.

In some examples of the method, apparatuses, and non-transitory computer-readable medium described herein, adjusting the quantity of active receivers at the UE may include operations, features, means, or instructions for decreasing the quantity of active receivers at the UE from a first quantity of active receivers to a second quantity of active receivers, where the method further includes, detecting one or more downlink grants from the base station scheduling communications associated with the first quantity of active receivers, increasing the quantity of active receivers from the second quantity of active receivers to the first quantity of active receivers for a period of time based on detecting the one or more downlink grants, and decreasing the quantity of active receivers from the first quantity of active receivers to the second quantity of active receivers after the period of time.

A method for wireless communication at a UE is described. The method may include receiving, from a base station, an activation message for a BWP of a set of multiple BWPs configured for the UE, monitoring for one or more downlink grants while operating in the BWP, the one or more downlink grants for receiving one or more downlink signals in the active BWP, and adjusting a quantity of active receivers at the UE based on whether the one or more downlink grants are detected.

An apparatus for wireless communication at a UE is described. The apparatus may include a processor, memory coupled with the processor, and instructions stored in the memory. The instructions may be executable by the processor to cause the apparatus to receive, from a base station, an activation message for a BWP of a set of multiple BWPs configured for the UE, monitor for one or more downlink grants while operating in the BWP, the one or more downlink grants for receiving one or more downlink signals in the active BWP, and adjust a quantity of active receivers at the UE based on whether the one or more downlink grants are detected.

Another apparatus for wireless communication at a UE is described. The apparatus may include means for receiving, from a base station, an activation message for a BWP of a set of multiple BWPs configured for the UE, means for monitoring for one or more downlink grants while operating in the BWP, the one or more downlink grants for receiving one or more downlink signals in the active BWP, and means for adjusting a quantity of active receivers at the UE based on whether the one or more downlink grants are detected.

A non-transitory computer-readable medium storing code for wireless communication at a UE is described. The code may include instructions executable by a processor to receive, from a base station, an activation message for a BWP of a set of multiple BWPs configured for the UE, monitor for one or more downlink grants while operating in the BWP, the one or more downlink grants for receiving one or more downlink signals in the active BWP, and adjust a quantity of active receivers at the UE based on whether the one or more downlink grants are detected.

Some examples of the method, apparatuses, and non-transitory computer-readable medium described herein may further include operations, features, means, or instructions for failing to detect one or more downlink grants from the base station while operating in the BWP, where adjusting the quantity of active receivers at the UE may include operations, features, means, or instructions for decreasing the quantity of active receivers at the UE from a first quantity of active receivers to a second quantity of active receivers based on failing to detect the one or more downlink grants from the base station.

Some examples of the method, apparatuses, and non-transitory computer-readable medium described herein may further include operations, features, means, or instructions for transmitting, to the base station and before decreasing the quantity of active receivers at the UE, signaling based on the second quantity of active receivers.

In some examples of the method, apparatuses, and non-transitory computer-readable medium described herein, transmitting the signaling based on the second quantity of active receivers may include operations, features, means, or instructions for transmitting CSF, an SRS, or both to the base station according to a format associated with the second quantity of active receivers.

Some examples of the method, apparatuses, and non-transitory computer-readable medium described herein may further include operations, features, means, or instructions for activating a timer based on transmitting the signaling, where decreasing the quantity of active receivers at the UE from the first quantity of active receivers to the second quantity of active receivers occurs based on expiration of the timer.

Some examples of the method, apparatuses, and non-transitory computer-readable medium described herein may further include operations, features, means, or instructions for activating a second timer based on whether or not one or more second downlink grants may be detected during a duration associated with the timer, where decreasing the quantity of active receivers at the UE occurs based on expiration of the timer and the second timer.

Some examples of the method, apparatuses, and non-transitory computer-readable medium described herein may further include operations, features, means, or instructions for detecting one or more second downlink grants from the base station while operating in the BWP and after decreasing the quantity of active receivers from the first quantity of active receivers to the second quantity of active receivers and increasing the quantity of active receivers at the UE from the second quantity of active receivers to a third quantity of active receivers based on detecting the one or more second downlink grants from the base station.

In some examples of the method, apparatuses, and non-transitory computer-readable medium described herein, adjusting the quantity of active receivers at the UE may include operations, features, means, or instructions for decreasing the quantity of active receivers at the UE from a first quantity of active receivers to a second quantity of active receivers, where the method further includes, detecting one or more downlink grants from the base station scheduling communications associated with the first quantity of active receivers, increasing the quantity of active receivers from the second quantity of active receivers to the first quantity of active receivers for a period of time based on detecting the one or more downlink grants, and decreasing the quantity of active receivers from the first quantity of active receivers to the second quantity of active receivers after the period of time.

In some examples of the method, apparatuses, and non-transitory computer-readable medium described herein, each BWP of the set of multiple BWPs may have a same bandwidth.

DETAILED DESCRIPTION

Figure 1:
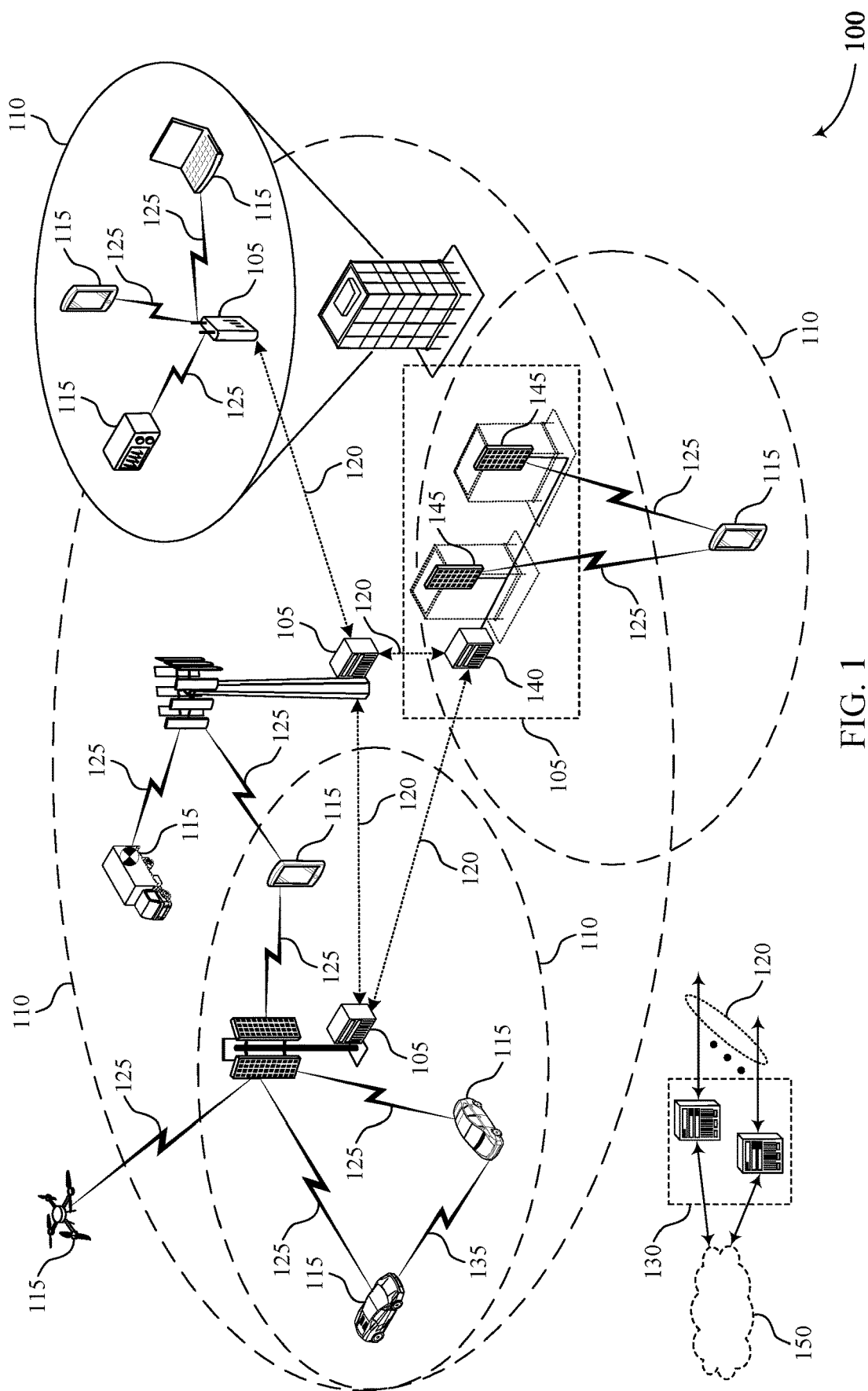
FIGS. 1 and 2 illustrate examples of a wireless communications system that supports receiver adjustment for wireless communication in accordance with aspects of the present disclosure.

In some examples, a wireless communications system may support multiple-input multiple-output (MIMO) communication. In one example of MIMO communication, a base station may split a signal into multiple data streams and transmit the multiple data streams to a user equipment (UE). In order to simultaneously receive the multiple data streams, the UE may use multiple active receivers (e.g., a different active receiver for each data stream). Having a large number of active receivers (e.g., 4 active receivers as opposed to 2 active receivers) may increase throughput (e.g., increase the number of data streams that the UE may receive at one time) and may be advantageous during times of high data traffic. However, in some examples, the UE may experience periods of low data traffic and in such cases, maintaining a large number of receives in an active state may be inefficient in terms of power consumption.

In some examples, a UE may be configured with multiple bandwidth parts (BWPs). At a given time, for example, one BWP of the multiple BWPs may be active. To activate and switch to another BWP, the UE may receive instructions from the base station. In some examples, the UE may be configured with two or more BWPs of different sizes. BWP switching may be correlated with changes in data traffic patterns, and thus, as described herein, the UE may adapt a number of active receivers at the UE based on one or more characteristics of a newly activated BWP.

In one example, the UE may receive, from the base station, an activation message for a small BWP (e.g., a BWP having a bandwidth below a threshold, or a BWP having a smaller bandwidth than at least one other configured BWP). Switching to or otherwise being indicated to use the small BWP may indicate that a low data traffic pattern is upcoming, and, as such, the UE may decrease the number of active receivers. In another example, the UE may receive, from the base station, an activation message for a large BWP (e.g., a BWP having a bandwidth above a threshold, or a BWP having a larger bandwidth than at least one other configured BWP). Switching to or otherwise being indicated to use the large BWP may indicate that a high data traffic pattern is upcoming and as such, the UE may increase the number of active receivers. In some examples, if the UE does not receive any downlink (DL) grants for a duration while operating in the large BWP, the UE may decrease the number of active receivers. When decreasing the number of active receivers, the UE may transmit one or more messages or other signals (e.g., feedback messages) to the base station reflecting the decrease in active receivers (e.g., the UE may transmit a channel state feedback (CSF) report or one more sounding reference signals (SRSs) using or otherwise reflecting the decreased quantity of active receivers), and the UE may thereafter wait a duration before decreasing the number of active receiver.

Additionally or alternatively, the base station may configure the UE with two or more BWPs of the same size (e.g., same bandwidth). In such cases, the UE may operate in accordance with techniques as described for operating in a large BWP. For example, if the UE does not receive any DL grants from the base station for a duration upon switching to a BWP of the same size, the UE may decrease the number of active receivers at the UE. Additionally, as another example, the UE may transmit signaling to the base station reflecting the decrease in active receivers and wait a duration before decreasing the number of active receivers.

Aspects of the disclosure are initially described in the context of wireless communications systems. Additional aspects are described in the context of BWP switching schemes and process flows. Aspects of the disclosure are further illustrated by and described with reference to apparatus diagrams, system diagrams, and flowcharts that relate to receiver adjustment for wireless communication.

FIG. 1 illustrates an example of a wireless communications system 100 that supports receiver adjustment for wireless communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords).

Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, the UE 115 may adjust a number of receiver that are active at the UE 115 based on a BWP that the UE is currently using (e.g., transmitting or receiving signals within) or has been indicated to use. For example, the UE 115 may receive, from a base station, an indication to activate a BWP of a set of BWPs configured for the UE 115. The set of BWPs may include BWPs of the same size (e.g., same bandwidth) or BWPs of different sizes (e.g., different bandwidth). If the base station 105 indicates to activate a large BWP (e.g., a BWP with a bandwidth above a threshold), the UE 115 may increase the number of active receivers (e.g., the UE 115 may activate four receivers). Alternatively, if the base station indicates to activate a small BWP (e.g., a BWP with a bandwidth below a threshold), the UE 115 may decrease the number of activate receivers (e.g., the UE 115 may activate two receivers). Additionally, in some examples, the UE 115 may monitor for downlink grants from the base station 105 while operating in an active BWP and adjust the number of active receivers based on whether or not the UE 115 receives a downlink grant from the base station 105. Using these and other techniques described herein, the UE 115 may adjust the number of active receivers based on data traffic which may allow that UE 115 to conserve power.

Figure 2:
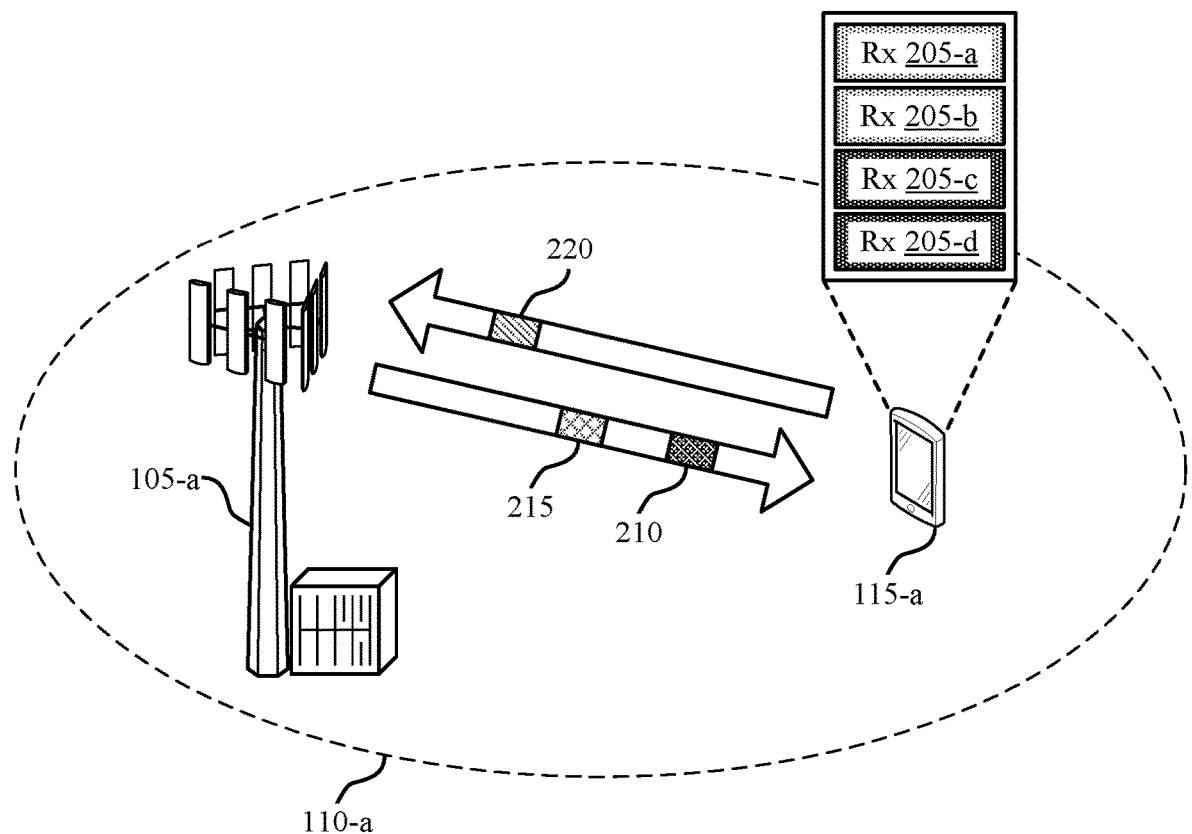

FIG. 2 illustrates an example of a wireless communications system 200 that supports receiver adjustment for wireless communication in accordance with aspects of the present disclosure. In some examples, the wireless communications system 200 may implement aspects of a wireless communications system 100. For example, the wireless communications system 200 may include a base station 105-a and a UE 115-a which may be examples of a base station 105 and a UE 115 as described with reference to FIG. 1. In some examples, the base station 105-a and the UE 115-a may be located in a coverage area 110-a.

In some examples, the wireless communications system 200 may support MIMO communication. MIMO communication may allow for a wireless device (e.g., a base station 105-a or a UE 115-a) to transmit and receive two or more signals over the same time resources. In one example, the two or more signals may carry the same data (e.g., for diversity reasons). In another example, the wireless device may split data into two or more portions and each of the two or more signals may carry a portion of the data (e.g., spatial multiplexing).

Whether to support MIMO or otherwise, in order to concurrently receive the two or more signals, a receiving device (e.g., a UE 115-a) may include multiple receivers. The quantity of receivers at the wireless device may correspond to the quantity of signals the wireless device may receive over the same time resources. For example, the UE 115-a may include four receivers 205 (e.g., a receiver 205-a, a receiver 205-b, a receiver 205-c, and a receiver 205-d) and as such, the UE 115-a may simultaneously receive a maximum of four signals from another wireless device (e.g., a base station 105-a) if all four receivers 205 are active. In some examples, activating a threshold number of receivers 205 (e.g., four receivers) at the UE 115-a may increase data throughput in situations of high data traffic (e.g., data traffic above a threshold), but activating the threshold number of receivers 205 at the UE 115-a in situations of low data traffic (e.g., data traffic below a threshold) may not increase data throughput and may result in unnecessary power consumption.

In some examples, a wireless device supporting MIMO communication or otherwise including multiple receivers may undergo a BWP switch or otherwise begin using a BWP. For example, the base station 105-a may configure the UE 115-a with a set of BWPs (e.g., up to four BWPs). In some examples, each BWP of the set of BWPs may be of the same size (e.g., span the same amount of frequency or bandwidth). In another example, at least two BWPs of the set of BWPs may be different sizes (e.g., span different amounts of frequency or bandwidth). In some examples, a single BWP of the set of BWPs for uplink or downlink may be active at one time. That is, the base station 105-a and the UE 115-a may communicate with one another using a single BWP at a given time. In some examples, a base station 105-a may initiate a BWP switch or otherwise configure the UE 115-a to commence using a BWP based on a level of upcoming data traffic. For example, the UE 115-a may initially operate in a small BWP (e.g., 15 kHz BWP). If the base station 105-a expects high data traffic, the base station 105-a may transmit a BWP switch indication 210 (e.g., via downlink control information (DCI)) to the UE 115-a indicating for the UE 115-a to switch to a large BWP (e.g., 60 kHz). Upon receiving the BWP switch indication 210, the UE 115-a may switch from operating in the small BWP to operating in the large BWP and communicate with the base station 105-a using the large BWP.

As described herein, a UE 115-a may adjust a quantity of active receivers based on the active BWP. In one example, the UE 115-a may be configured with BWPs of different sizes. For example, a UE 115-a may be configured with a set of BWPs, where the set of BWPs includes at least one large BWP and at least one small BWP. A UE 115-a may determine whether a BWP of the set is large or small by comparing the BWP to a threshold. If the frequency span of the BWP is above the threshold, the UE 115-a may consider the BWP large. If the frequency spans of the BWP is below the threshold, the UE 115-a may consider the BWP small. In some examples, the UE 115-a may receive the BWP switch indication 210 from the base station 105-a indicating for the UE 115-a to switch to a large BWP (e.g., from a small BWP or from a large BWP). As described above. switching to a large BWP may indicate that data traffic may increase or stay above a threshold. As such, upon receiving the BWP switch indication 210, the UE 115-a may activate (or keep active) all of the receivers 205 available to the UE 115-a. For example, the UE 115-a may activate (or keep active) the receiver 205-a, the receiver 205-b, the receiver 205-c, and the receiver 205-d (e.g., operate according to 4Rx). In some examples, the UE 115-a may keep all of the receivers 205 active until the UE 115-a receives another BWP switch indication 210 from the base station 105-a.

In another example, the UE 115-a may activate a downlink inactivity timer upon receiving the BWP switch indication 210 indicating for the UE 115-a to switch to the large BWP. If the UE 115-a does not receive a downlink grant 215 from the base station 105-a before the timer expires, the UE 115-a may decrease the number of active receivers 205 at the UE 115-a (e.g., deactivate one or more receivers 205). For example, the UE 115-a may deactivate the receiver 205-c and the receiver 205-d and keep the receiver 205-a and the receiver 205-b active (e.g., operate according to 2Rx). In some examples, the UE 115-a may reactivate the one or more receivers 205 if the UE 115-a detects a downlink grant 215. That is, the UE 115-a may detect a downlink grant some time after expiration of the downlink inactivity timer and reactivate the receiver 205-c and the receiver 205-d. Alternatively, the UE 115-a may detect a downlink grant 215 before expiration of the downlink inactivity timer. In such case, the UE 115-a may keep all of the receivers 205 active for at least the full duration of the large BWP.

In another example, the UE 115-a may receive the BWP switch indication 210 from the base station 105-a indicating for the UE 115-a to switch to a small BWP (e.g., from a small BWP or from a large BWP). As described above. switching to a small BWP may indicate that data traffic may decrease or stay below a threshold. As such, upon receiving the BWP switch indication 210 from the base station 105-a, the UE 115-a may decrease the number of active receivers 205 at the UE 115-a (e.g., deactivate one or more of the receivers 205). For example, the UE 115-a may deactivate the receiver 205-c and the receiver 205-d and keep the receiver 205-a and the receiver 205-b active (e.g., operate according to 2Rx).

Alternatively, the UE 115-a may be configured with BWPs of the same size. For example, a UE 115-a may be configured with a set of BWPs, where each BWP of the set is the same size (e.g., span the same amount of frequency). In such example, upon receiving the BWP switch indication 210 indicating to switch to another BWP of the same size, the UE 115-a may activate the downlink inactivity timer. If the UE 115-a does not receive a downlink grant 215 from the base station before the downlink inactivity timer expires, the UE 115-a may decrease the number of active receiver 205 at the UE 115-a (e.g., deactivate one or more receivers 205). For example, the UE 115-a may deactivate the receiver 205-c and the receiver 205-d and keep the receiver 205-a and the receiver 205-b active (e.g., operate according to 2Rx). In some examples, the UE 115-a may increase the number of active receivers 205 at the UE 115-a (e.g., reactivate the one or more receivers 205) if the UE 115-a detects a downlink grant 215. That is, the UE 115-a may detect a downlink grant some time after expiration of the downlink inactivity timer and reactivate the receiver 205-c and the receiver 205-d. Alternatively, the UE 115-a may detect a downlink grant 215 before expiration of the downlink inactivity timer. In such cases, the UE 115-a may keep all of the receivers 205 active for at least the full duration of the BWP.

In some examples, before the UE 115-a may deactivate one or more receivers 205, the UE 115-a may undergo a feedback detection procedure. During the feedback detection procedure, the UE 115-a may transmit one or more messages 220 to the base station 105-a, which may indicate (e.g., reflect) that the UE 115-a is decreasing its number of active receivers 205. For example, the UE 115-a may determine to decrease the number of active receivers 205 from a first quantity of active receivers (e.g., four receivers) to a second quantity of active receivers (e.g., two active receivers) when switching to a small BWP or upon expiration of the downlink inactivity timer. Before decreasing the number of active receivers at the UE 115-a, the UE 115-a may keep the first quantity of receivers active to receive and decode downlink signals from the base station 105-a and transmit one or more messages 220 to the base station 105-a according to a format associated with the second quantity of active receivers. For example, if the UE 115-a determines to decrease from four active receivers to two active receivers, the UE 115-a may transmit one or more 2-layer signals or messages (e.g., a 2-layer CSF report or a 2-layer SRS). In some examples, once the UE 115-a transmits the one or more feedback message to the base station 105-a, the UE 115-a may activate a first timer (e.g., a $W_{2RX}$ timer). If the UE 115-a does not receive a downlink grant 215 associated with the first quantity of active receivers (e.g., ¾ layer grant) before expiration of the first timer, the UE 115-a may decrease the number of active receiver from the first quantity of active receivers to the second quantity of active receivers upon expiration of the first timer. Alternatively, if the UE 115-a receives a downlink grant 215 associated with the first quantity of active receivers (e.g., ¾ layer grants) before expiration of the first timer, the UE 115-a may activate a second timer (e.g., a $W_{FS}$ timer) and decrease the number of active receiver from the first quantity of active receivers to the second quantity of active receivers upon expiration of the first timer and the second timer.

In some examples, the UE 115-a may decrease the number of active receivers from the first quantity of active receivers to the second quantity of active receivers and the base station 105-a may transmit one or more downlink grants 215 associated with the first quantity of receivers to the UE 115-a. In such case, after decreasing the number of active receivers, the UE 115-a may monitor for one or more downlink grants 215 associated with the first quantity of active receivers. If a downlink grant 215 associated with the first quantity of active receivers is detected, the UE 115-a may activate the downlink inactivity timer and increase the number of active receivers for a duration of the downlink activity timer and decrease the number of active receivers once the downlink inactivity timer expires.

Figure 3:
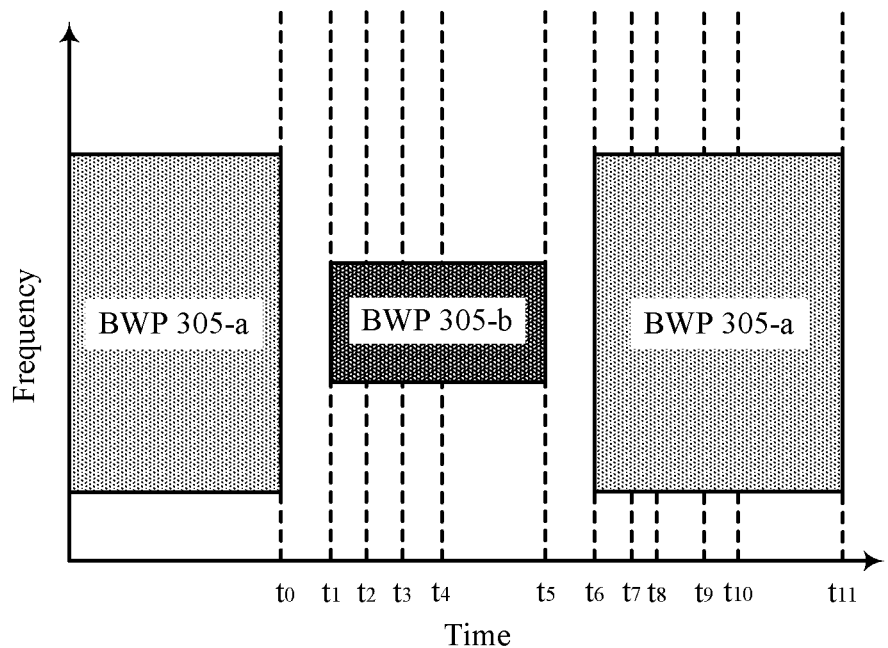
FIGS. 3 and 4 illustrate examples of a bandwidth part (BWP) switching scheme that supports receiver adjustment for wireless communication in accordance with aspects of the present disclosure.
Figure 3:
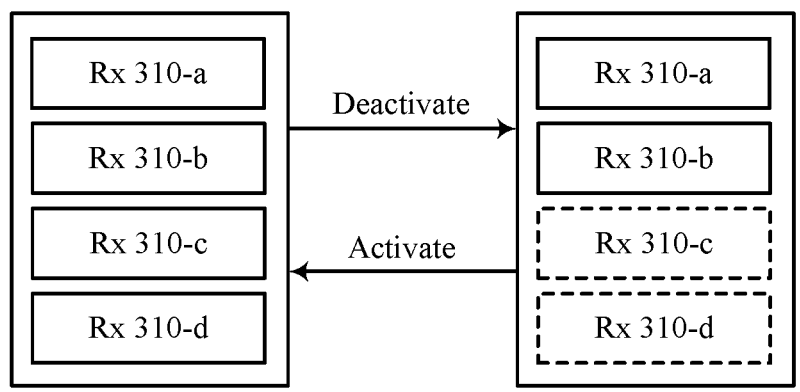

FIG. 3 illustrates an example of a BWP switching scheme 300 that supports receiver adjustment for wireless communication in accordance with aspects of the present disclosure. In some examples, the BWP switching scheme 300 may implement aspects of a wireless communications system 100 and a wireless communications system 200. For example, the BWP switching scheme 300 may include receivers 310 which may be examples of receivers 205 as described with reference to FIG. 2. In some examples, a UE may implement BWP switching scheme 300 to adjust the number of receivers active at the UE.

In some examples, a base station may configure the UE with multiple BWPs 305 (up to four BWPs). For example, the base station may configure the UE with a BWP 305-a and a BWP 305-b. The BWP 305-a may be considered a large BWP (e.g., spans an amount of frequency that is above a threshold), whereas the BWP 305-b may be considered a small BWP (e.g., spans an amount of frequency that is below a threshold). The UE may initially operate in the BWP 305-a and communicate with the base station using four active receivers. For example, the UE 115 may communicate with the base station using a receiver 310-a, a receiver 310-b, a receiver 310-c, and a receiver 310-d. As such, the UE may be capable of receiving 3-layer and 4-layer transmissions from the base station.

In some examples, the base station may anticipate a decrease in data traffic. In such case, the base station may transmit a BWP switch indication (e.g., an activation message for a currently unused BWP 305) to the UE at to. The BWP switch indication may indicate for the UE to switch from the BWP 305-a to the BWP 305-b (e.g., may indicate that the UE is to begin using the BWP 305-b, which may implicitly indicate that the UE is to cease using the BWP 305-a). In response to the BWP switch indication, the UE may activate the BWP 305-b at $t_1$ and decrease the number of active receivers from a first quantity of active receivers (e.g., four active receivers) to a second quantity of active receivers (e.g., two active receivers). For example, the UE may deactivate the receiver 310-c and the receiver 310-d and maintain the receiver 310-a and the receiver 310-b in an active state.

Before decreasing the number of active receivers 310 at the UE, the UE may perform a receiver feedback procedure to inform the base station of the adjustment in active receivers at the UE. For example, before decreasing the number of active receivers at the UE and after activating the BWP 305-b at $t_1$, the UE may transmit one or more messages or other signaling to the base station according to a format associated with the second quantity of active receivers and activate a first timer at $t_2$. For example, the UE may transmit a 2-layer CSF report, a 2-layer SRS, or both to the base station. From $t_1$ to $t_2$ the UE may operate using the first quantity of active receivers and receive and decode downlink signals from the base station. The first timer may expire at $t_3$. If the UE does not receive one or more (or some threshold quantity of) downlink grants associated with the first quantity of active receivers from $t_2$ to $t_3$, the UE may decrease the number of active receivers from the first quantity of active receivers to the second quantity of active receivers at $t_3$ or shortly after $t_3$. If the UE does receive one or more downlink grants associated with the first quantity of active receivers from $t_2$ to $t_3$, the UE may activate a second timer at $t_3$. The second timer may expire at $t_4$. In such case, the UE may decrease the number of active receivers from the first quantity of active receivers to the second quantity of active receivers at $t_4$ or shortly after $t_4$. That is, the UE may decrease the number of active receiver after the first timer and the second timer. In some examples, the UE may operate with the second quantity of active receivers until the UE receives another BWP switch indication, for example, at $t_5$.

In some examples, the base station may anticipate an increase in data traffic. In such case, at $t_5$, the base station may transmit a BWP switch indication to the UE indicating for the UE to switch from the BWP 305-b to the BWP 305-a and may activate the BWP 305-a at $t_6$. In one example, upon activating the BWP 305-a, the UE may increase the number of active receivers from the second quantity of active receivers to a third quantity of active receivers and utilize the third quantity of active receiver until another BWP switch indication is received, for example, at $t_{10}$. For example, the UE may activate the receiver 310-c and the receiver 310-d and the receiver 310-a and the receiver 310-b may remain in an active state. In another example, the UE may activate a downlink activity timer at $t_6$. The downlink inactivity timer may expire at $t_7$. If the UE does receive one or more downlink grants from the base station before expiration of the downlink inactivity timer at $t_7$, the UE may not adjust the number of active receiver at the UE and operate using the third quantity of active receivers until another BWP switch is received, for example, at $t_{11}$. If the UE does not receive one or more downlink grants from the base station before expiration of the downlink inactivity timer at $t_7$, the UE may decrease the number of active receiver at the UE from the third quantity of active receiver to a fourth quantity of active receivers. For example, the UE may deactivate the receiver 310-c and the receiver 310-d and the receiver 310-a and the receiver 310-b may remain in an active state.

Before decreasing the number of active receivers 310 at the UE, the UE may perform a receiver feedback or other signaling procedure, which may inform the base station of the adjustment in active receivers at the UE. For example, before decreasing the number of active receivers at the UE, the UE may transmit one or more feedback messages to the base station according to a format associated with the fourth quantity of active receivers and activate a first timer at $t_8$. For example, the UE may transmit 2-layer CSF report, a 2-layer SRS, or both to the base station. The first timer may expire at $t_9$. If the UE does not receive one or more downlink grants associated with the third quantity of active receivers from $t_8$ to $t_9$, the UE may decrease the quantity of active receivers from the third quantity to the fourth quantity of receivers at $t_9$ or shortly after $t_9$. If the UE does receive one or more downlink grants associated with the first quantity of active receivers from $t_8$ to $t_9$, the UE may activate a second timer at $t_9$. The second timer may expire at $t_{10}$. Upon expiration of the second timer, the UE may decrease the number of active receivers from the third quantity of active receivers to the fourth quantity of active receivers at $t_{10}$ or shortly after $t_{10}$. That is, the UE may decrease the number of active receiver after the first timer and the second timer. In some examples, the UE may operate with the fourth quantity of active receivers until the UE receives another BWP switch indication, for example, at $t_{11}$.

Figure 4:
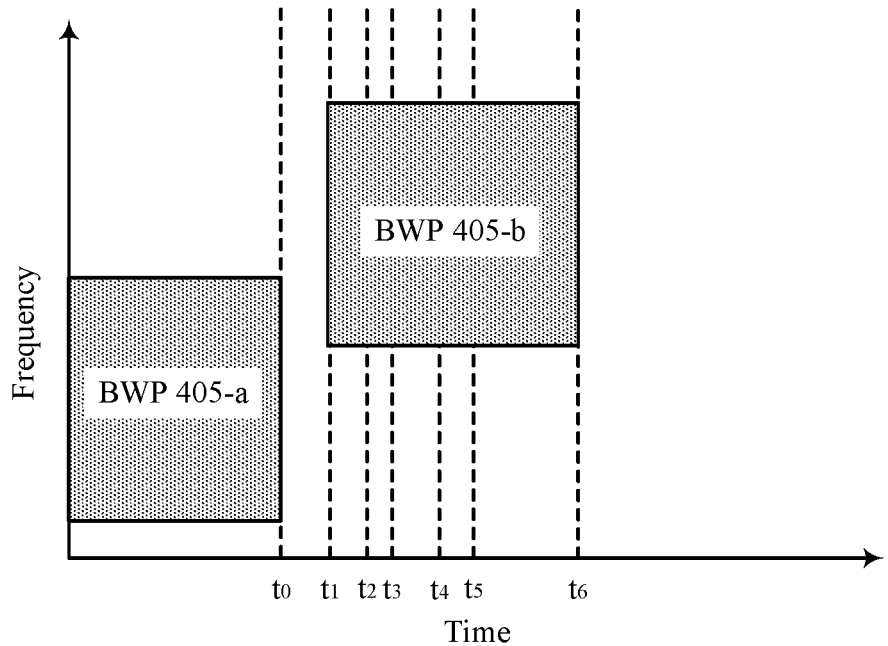
Figure 4:
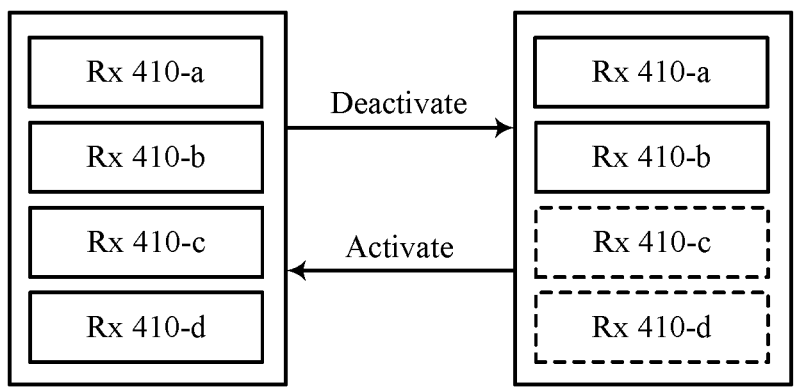

FIG. 4 illustrates an example of a BWP switching scheme 400 that supports receiver adjustment for wireless communication in accordance with aspects of the present disclosure. In some examples, the BWP switching scheme 400 may implement aspects of a wireless communications system 100, a wireless communications system 200, or a BWP switching scheme 300. For example, the BWP switching scheme 400 may include receivers 410 which may be examples of receivers 205 and receivers 310 as described with reference to FIGS. 2 and 3. In some examples, a UE may implement BWP switching scheme 400 to adjust the number of receivers active at the UE.

In some examples, a base station may configure a UE with multiple BWPs 405 (up to four BWPs). For example, the base station may configure the UE with a BWP 405-a and a BWP 405-b. The BWP 405-a and the BWP 405-b may be considered the same size (e.g., span a similar amount of frequency). The UE may initially operate in the BWP 405-a and communicate with the base station using a first quantity of receivers (e.g., four receivers). For example, the UE may communicate with the base station using a receiver 410-a, a receiver 410-b, a receiver 410-c, and a receiver 410-d. As such, the UE may be capable of receiving 3-layer and 4-layer transmissions from the base station.

In some examples, at to, the base station may transmit a BWP switch indication to the UE indicting for the UE to switch from the BWP 405-a to the BWP 405-b and may activate the BWP 405-*b* at t₁ (e.g., may transmit an activation message for the BWP 405-*b*, which may implicitly indicate that the UE is to cease using the BWP 405-*a*). Upon activating the BWP 405-*a*, the UE may maintain the first quantity of active receivers and activate a downlink inactivity timer at t₁. The downlink inactivity timer may expire at t₂. If the UE does receive one or more downlink grants from the base station before expiration of the downlink inactivity timer at t₂, the UE may not adjust the number of active receiver at the UE and operate with the first quantity of active receivers until another BWP switch is received, for example, at t₆. If the UE does not receive one or more downlink grants from the base station before expiration of the downlink inactivity timer at t₂, the UE may decrease the number of active receiver at the UE from the first quantity of active receiver to a second quantity of active receivers (e.g., two active receivers). For example, the UE may deactivate the receiver 410-*c* and the receiver 410-*d* and the receiver 410-*a* and the receiver 410-*b* may remain in an active state.

Before decreasing the number of active receivers 410 at the UE, the UE may perform a receiver feedback procedure to inform the base station of the adjustment in active receivers at the UE. For example, before decreasing the number of active receivers at the UE, the UE may transmit one or more messages or other signaling to the base station according to a format associated with the second quantity of active receivers and activate a first timer at t₃. For example, the UE may transmit a 2-layer CSF report, a 2-layer SRS, or both to the base station. The first timer may expire at t₄. If the UE does not receive one or more downlink grants associated with the first quantity of active receivers from t₃ to t₄, the UE may decrease the quantity of active receivers from the first quantity to the second quantity of receivers at t₄ or shortly after t₄. If the UE does receive one or more downlink grants associated with the first quantity of active receivers from t₃ to t₄, the UE may activate a second timer at t₄. The second timer may expire at t₅. Upon expiration of the second timer, the UE may decrease the number of active receivers from the first quantity of active receivers to the second quantity of active receivers at t₅ or shortly after t₅. That is, the UE may decrease the number of active receiver after the first timer and the second timer. In some examples, the UE may operate with the second quantity of active receivers until the UE receives another BWP switch indication, for example, at t₆.

Figure 5:
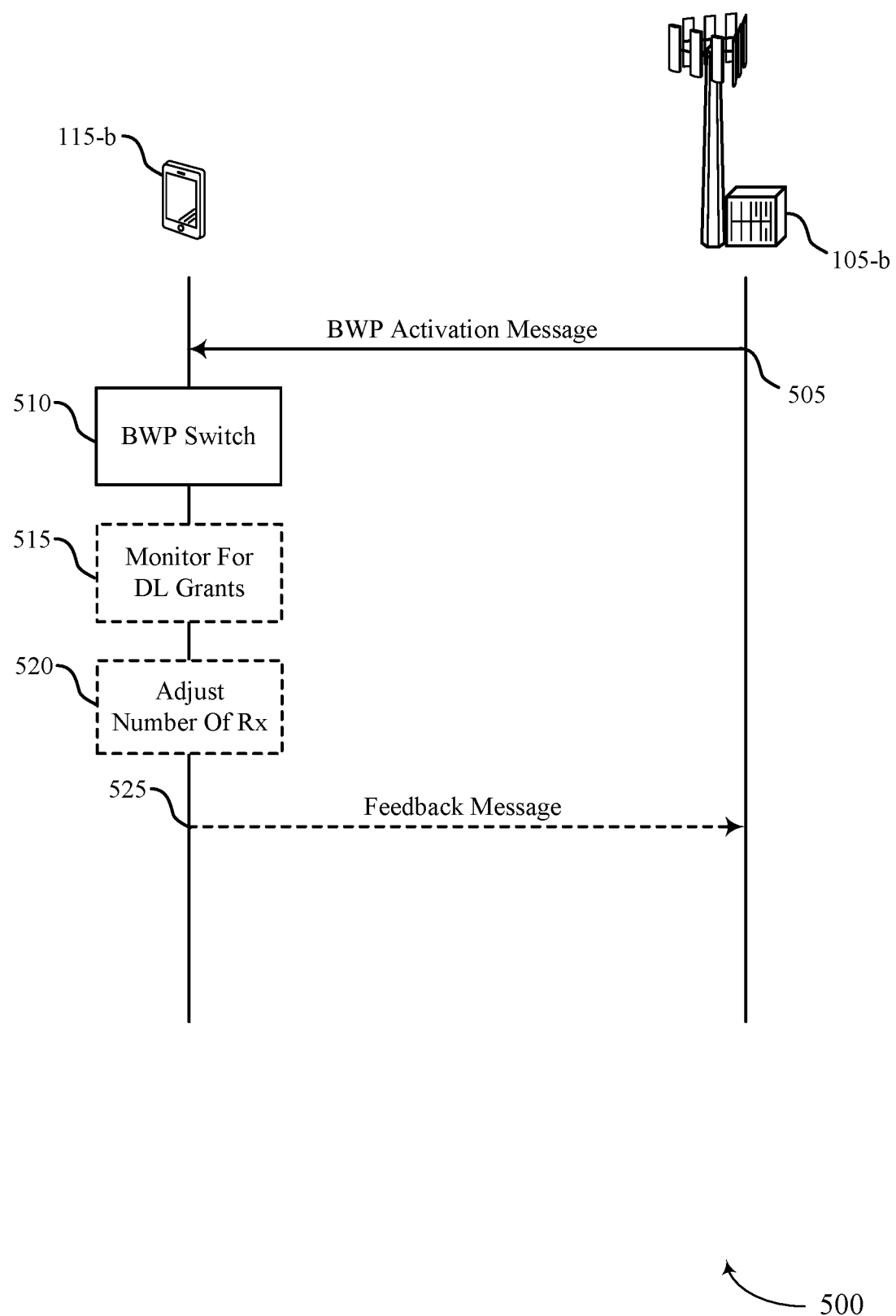
FIG. 5 illustrates an example of a process flow that supports receiver adjustment for wireless communication in accordance with aspects of the present disclosure.

FIG. 5 illustrates an example of a process flow 500 that supports receiver adjustment for wireless communication in accordance with aspects of the present disclosure. In some examples, the process flow 500 may implement or be implemented by aspects of a wireless communications system 100, a wireless communications system 200, a BWP switching scheme 300, or a BWP switching scheme 400. For example, the process flow 500 may be implemented by a base station 105-*b* and a UE 115-*b* which may be examples of a base station 105 and a UE 115 as described with reference to FIGS. 1 and 2. The process flow 500 may involve a UE 115-*b* adjusting a quantity of active receivers based on BWP switching. Alternative examples of the following may be implemented, where some steps are performed in a different order then described or are not performed at all. In some cases, steps may include additional features not mentioned below, or further steps may be added.

In some examples, the base station 105-*b* may configure the UE 115-*b* with a set of BWPs (e.g., up to four downlink BWPs and up to four uplink BWPs). The set of BWP may include BWPs of the same size (e.g., BWPs that span the same amount of resource blocks) or the set of BWP may include BWPs of different sizes (e.g., BWPs that span different amounts of resource blocks). If the set of BWPs include BWPs of different sizes, the set of BWPs may include at least one large BWP (e.g., BWP that spans an amount of resource blocks above a threshold) and at least one small BWP (e.g., BWP that spans an amount of resource blocks below a threshold). An example of a large BWP may be a BWP that spans 273 resource blocks and an example of a small BWP may be a BWP that spans 64 resource blocks.

At 505, a UE 115-*b* may receive a BWP activation message from the base station 105-*b*. The BWP activation message may indicate to activate a BWP of the set of BWPs. In the case of different size BWPs, the BWP activation message may indicate to activate a large BWP or a small BWP of the set of BWPs.

At 510, the UE 115-*b* may undergo a BWP switch based on the BWP activation message received at 505. That is, the UE may deactivate a previously active BWP of the set of BWPs and activate the BWP indicated in the BWP activation message. In the case of different BWPs, the UE 115-*b* may switch from a large BWP to a small BWP, from a small BWP to a large BWP, from a large BWP to a large BWP, or from a small BWP to a small BWP.

At 515, the UE 115-*b* may potentially monitor for downlink grants from the base station 105-*b*. For example, the UE 115-*b* may monitor for downlink grants from the base station 105-*b* upon activating a large BWP at 510. In another example, the UE 115-*b* may monitor for downlink grants from the base station 105-*b* upon activating a BWP of a set of BWP of the same size. In some examples, the BWP activation message may trigger a downlink inactivity timer and the UE 115-*b* may monitor for downlink grants from the base station 105-*b* based on the downlink inactivity timer. In some examples, the base station 105-*b* may configure the UE 115-*b* with the downlink inactivity timer via radio resource control (RRC) signaling.

At 520, the UE 115-*b* may adjust the number of active receivers at the UE 115-*b*. In some examples, the UE 115-*b* may include a first quantity of receivers (e.g., four receivers). Upon activation of a large BWP or a BWP of the same size at 510, the UE 115-*b* may activate the first quantity of receivers (e.g., activate the threshold amount of receivers). If the UE 115-*b* does not detect one or more downlink grants from the base station 105-*b* at 515 (e.g., upon expiration of the downlink inactivity timer), the UE 115-*b* may decrease the number of active receivers at the UE 115-*b*. For example, the UE 115-*b* may keep a second quantity of receivers (e.g., two receivers) active and deactivate the rest. In some examples, if the UE 115-*b* detects a downlink grant after decreasing the number of active receivers, the UE 115-*b* may increase the number of active receivers. That is, the UE 115-*b* may activate the first quantity of receivers. Alternatively, if the UE does detect one or more downlink grants from the base station 105-*b* at 515 (e.g., before expiration of the downlink inactivity timer), the UE 115-*b* may maintain the number of active receivers at the UE 115-*b*. For example, the UE 115-*b* may keep the first quantity of receivers active. Upon activation of a small BWP, the UE 115-*b* may decrease the number of active receivers at the UE 115-*b*. For example, the UE 115-*b* may keep the second quantity of receivers active and deactivate the rest.

Before the UE 115-*b* may decrease the number of active receivers at the UE 115-*b*, the UE 115-*b* may undergo a receiver feedback detection procedure. For example, the UE 115-*b* may determine to keep the second quantity of receivers (e.g., two receivers) active and deactivate the rest. Before the UE 115-*b* may deactivate the receivers, the UE 115-*b* may transmit one or more messages (e.g., feedback messages) to the base station 105-*b* at 525. The one or more messages may be formatted in such a way as to indicate or otherwise reflect a decrease in the number of active receivers at the UE 115-*b*. For example, in the case that the number of active receivers decreases to two, the one or more messages may be a 2-layer CSF report, a 2-layer SRS, or both.

Upon transmitting the one or more messages to the UE 115-*b*, the UE 115-*b* may activate a first timer and monitor for grants from the base station 105-*b* (e.g., 3-layer grants or 4-layer grant if the UE 115-*b* includes 4 receivers). If the UE 115-*b* fails to detect a grant from the base station 105-*b* before expiration of the first timer, the UE 115-*b* may decrease the number of active receivers at the UE 115-*b*. If the UE 115-*b* detects a grant from the base station 105-*b*, the UE 115-*b* may activate a second timer and decrease the number of active receivers at the UE 115-*b* upon expiration of the second timer. In some example, the base station 105-*b* may configure the UE 115-*b* with the first timer and the second timer via RRC signaling.

Figure 6:
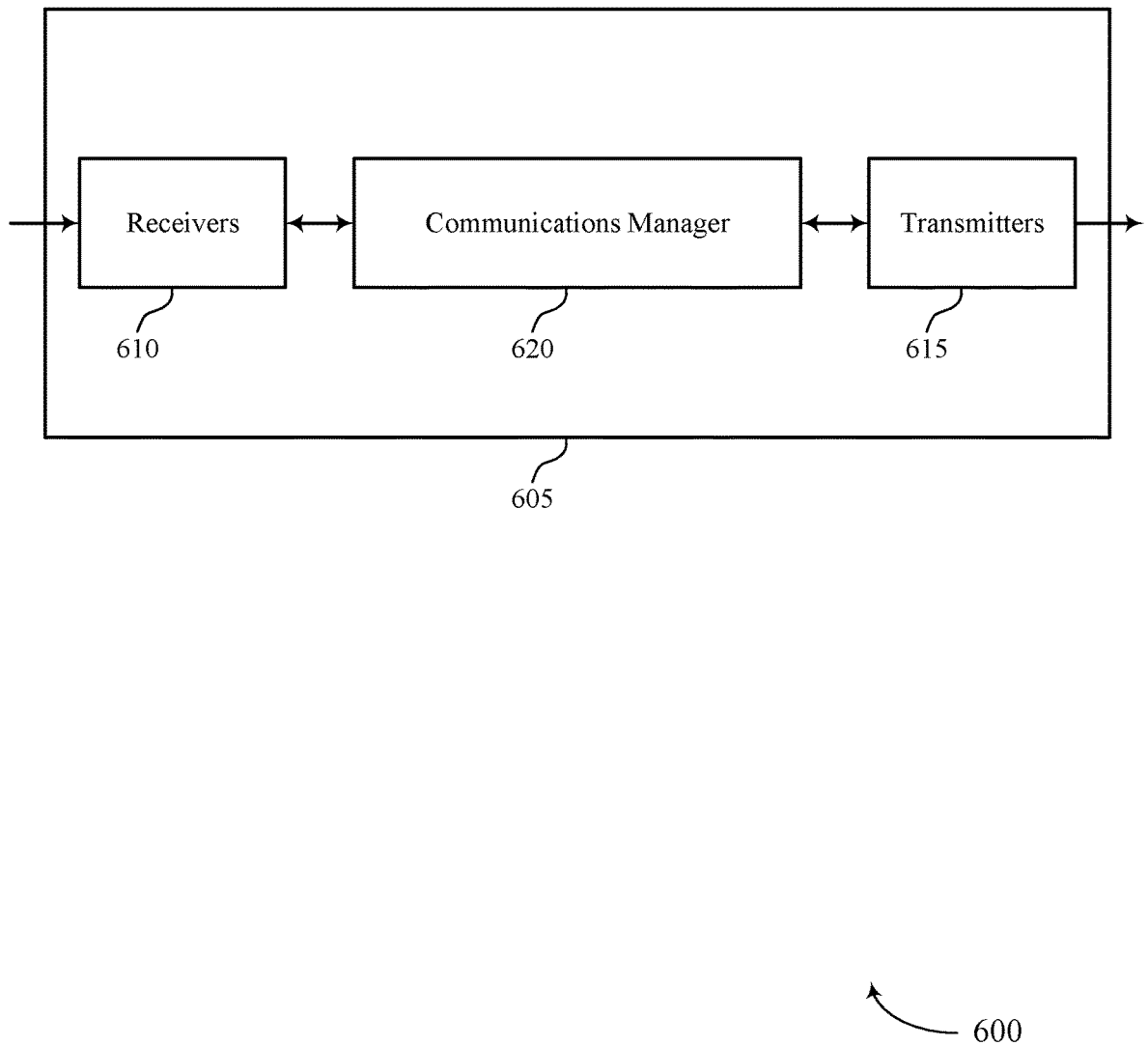
FIGS. 6 and 7 show block diagrams of devices that support receiver adjustment for wireless communication in accordance with aspects of the present disclosure.

FIG. 6 shows a block diagram 600 of a device 605 that supports receiver adjustment for wireless communication in accordance with aspects of the present disclosure. The device 605 may be an example of aspects of a UE 115 as described herein. The device 605 may include a set of receivers 610, a set of transmitters 615, and a communications manager 620. The device 605 may also include a processor. Each of these components may be in communication with one another (e.g., via one or more buses).

The receivers 610 may provide a means for receiving information such as packets, user data, control information, or any combination thereof associated with various information channels (e.g., control channels, data channels, information channels related to receiver adjustment for wireless communication). Information may be passed on to other components of the device 605. The receivers 610 each may utilize a single antenna or a set of multiple antennas. The receivers 610 each may be an example of a receiver 205, receiver 310, or receiver 410 as described herein.

The transmitters 615 may provide a means for transmitting signals generated by other components of the device 605. For example, the transmitters 615 may transmit information such as packets, user data, control information, or any combination thereof associated with various information channels (e.g., control channels, data channels, information channels related to receiver adjustment for wireless communication). In some examples, the transmitters 615 may be co-located with the receivers 610 in a transceiver module. The transmitters 615 each may utilize a single antenna or a set of multiple antennas. In some cases, a device 605 may alternatively include only one transmitter 615.

The communications manager 620, the receivers 610, the transmitters 615, or various combinations thereof or various components thereof may be examples of means for performing various aspects of receiver adjustment for wireless communication as described herein. For example, the communications manager 620, the receivers 610, the transmitters 615, or various combinations or components thereof may support a method for performing one or more of the functions described herein.

In some examples, the communications manager 620, the receivers 610, the transmitters 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receivers 610, the transmitters 615, or various combinations or components thereof may be implemented in code (e.g., as communications management software or firmware) executed by a processor. If implemented in code executed by a processor, the functions of the communications manager 620, the receivers 610, the transmitters 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receivers 610, the transmitters 615, or both. For example, the communications manager 620 may receive information from the receivers 610, send information to the transmitters 615, or be integrated in combination with the receivers 610, the transmitters 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a base station (e.g., via one or more of the receivers 610), an activation message for a second BWP of a set of multiple BWPs configured for the UE. The communications manager 620 may be configured as or otherwise support a means for switching from operating in a first BWP to operating in the second BWP based on the activation message for the second BWP. The communications manager 620 may be configured as or otherwise support a means for adjusting a quantity of active receivers at the UE (e.g., a quantity of active receivers included in the set of receivers 610) based on switching from operating in the first BWP to operating in the second BWP.

Additionally or alternatively, the communications manager 620 may support wireless communication at a UE in accordance with examples as disclosed herein. For example, the communications manager 620 may be configured as or otherwise support a means for receiving, from a base station (e.g., via one or more of the receivers 610), an activation message for a BWP of a set of multiple BWPs configured for the UE. The communications manager 620 may be configured as or otherwise support a means for monitoring for one or more downlink grants while operating in the BWP, the one or more downlink grants for receiving one or more downlink signals in the active BWP. The communications manager 620 may be configured as or otherwise support a means for adjusting a quantity of active receivers at the UE (e.g., a quantity of active receivers included in the set of receivers 610) based on whether the one or more downlink grants are detected.

By including or configuring the communications manager 620 in accordance with examples as described herein, the device 605 (e.g., a processor controlling or otherwise coupled to the receivers 610, the transmitters 615, the communications manager 620, or a combination thereof) may support techniques for reduced power consumption. Utilizing a small number of active receivers (e.g., two receivers) during periods of low data traffic may allow a device 605 to conserve power.

Figure 7:
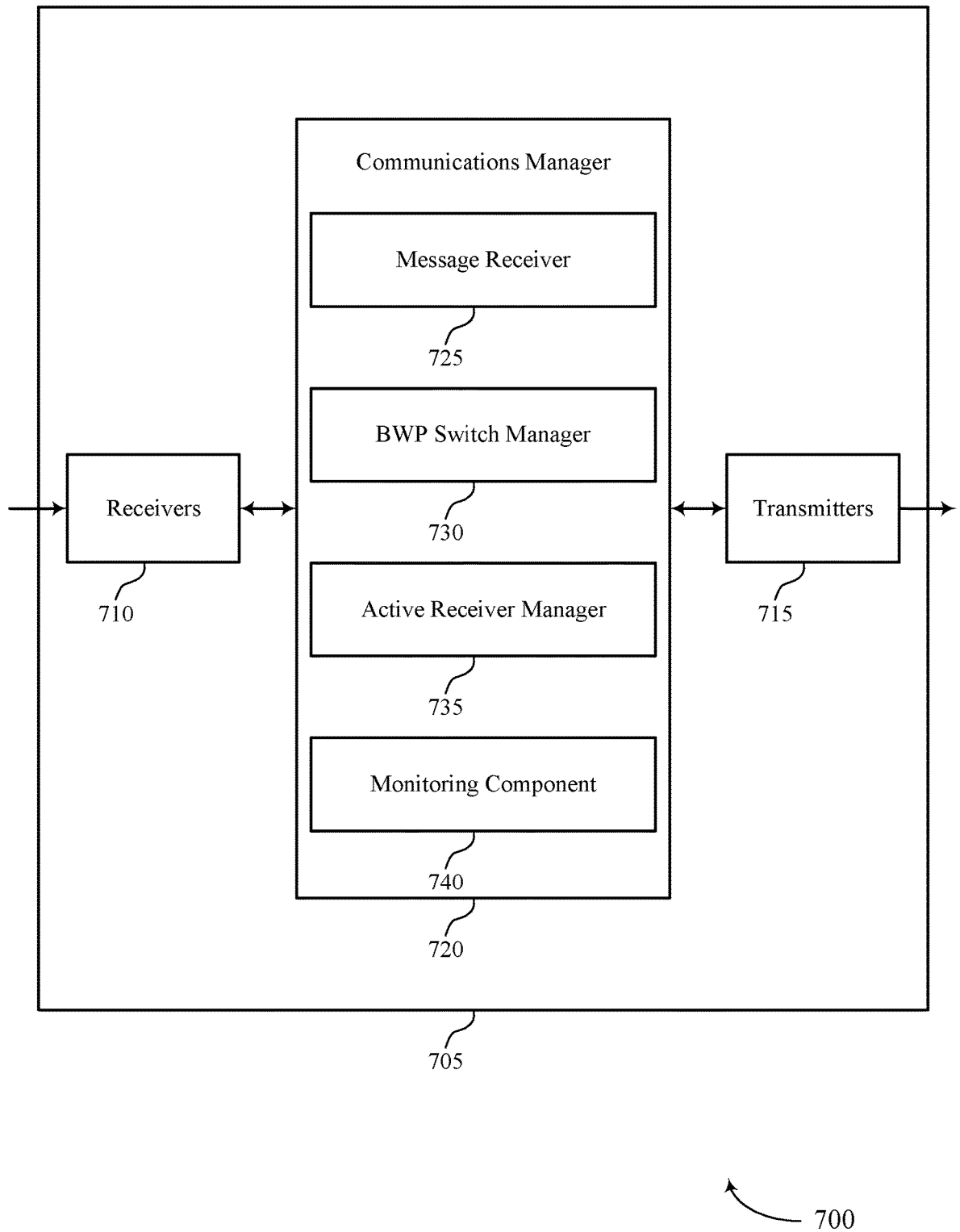

FIG. 7 shows a block diagram 700 of a device 705 that supports receiver adjustment for wireless communication in accordance with aspects of the present disclosure. The device 705 may be an example of aspects of a device 605 or a UE 115 as described herein. The device 705 may include a set of receivers 710, a set of transmitters 715, and a communications manager 720. The device 705 may also include a processor. Each of these components may be in communication with one another (e.g., via one or more buses).

The receivers 710 may provide a means for receiving information such as packets, user data, control information, or any combination thereof associated with various information channels (e.g., control channels, data channels, information channels related to receiver adjustment for wireless communication). Information may be passed on to other components of the device 705. The receivers 710 each may utilize a single antenna or a set of multiple antennas. The receivers 710 each may be an example of a receiver 205, receiver 310, receiver 410, or receiver 610 as described herein.

The transmitters 715 may provide a means for transmitting signals generated by other components of the device 705. For example, the transmitters 715 may transmit information such as packets, user data, control information, or any combination thereof associated with various information channels (e.g., control channels, data channels, information channels related to receiver adjustment for wireless communication). In some examples, the transmitters 715 may be co-located with the receivers 710 in a transceiver module. The transmitters 715 each may utilize a single antenna or a set of multiple antennas. In some cases, a device 705 may alternatively include only one transmitter 715.

The device 705, or various components thereof, may be an example of means for performing various aspects of receiver adjustment for wireless communication as described herein. For example, the communications manager 720 may include a message receiver 725, a BWP switch manager 730, an active receiver manager 735, a monitoring component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receivers 710, the transmitters 715, or both. For example, the communications manager 720 may receive information from the receivers 710, send information to the transmitters 715, or be integrated in combination with the receivers 710, the transmitters 715, or both to receive information, transmit information, or perform various other operations as described herein.

The communications manager 720 may support wireless communication at a UE in accordance with examples as disclosed herein. The message receiver 725 may be configured as or otherwise support a means for receiving, from a base station (e.g., via one or more of the receivers 710), an activation message for a second BWP of a set of multiple BWPs configured for the UE. The BWP switch manager 730 may be configured as or otherwise support a means for switching from operating in a first BWP to operating in the second BWP based on the activation message for the second BWP. The active receiver manager 735 may be configured as or otherwise support a means for adjusting a quantity of active receivers at the UE (e.g., a quantity of active receivers included in the set of receivers 710) based on switching from operating in the first BWP to operating in the second BWP.

Additionally or alternatively, the communications manager 720 may support wireless communication at a UE in accordance with examples as disclosed herein. The message receiver 725 may be configured as or otherwise support a means for receiving, from a base station (e.g., via one or more of the receivers 710), an activation message for a BWP of a set of multiple BWPs configured for the UE. The monitoring component 740 may be configured as or otherwise support a means for monitoring for one or more downlink grants while operating in the BWP, the one or more downlink grants for receiving one or more downlink signals in the active BWP. The active receiver manager 735 may be configured as or otherwise support a means for adjusting a quantity of active receivers at the UE (e.g., a quantity of active receivers included in the set of receivers 710) based on whether the one or more downlink grants are detected.

Figure 8:
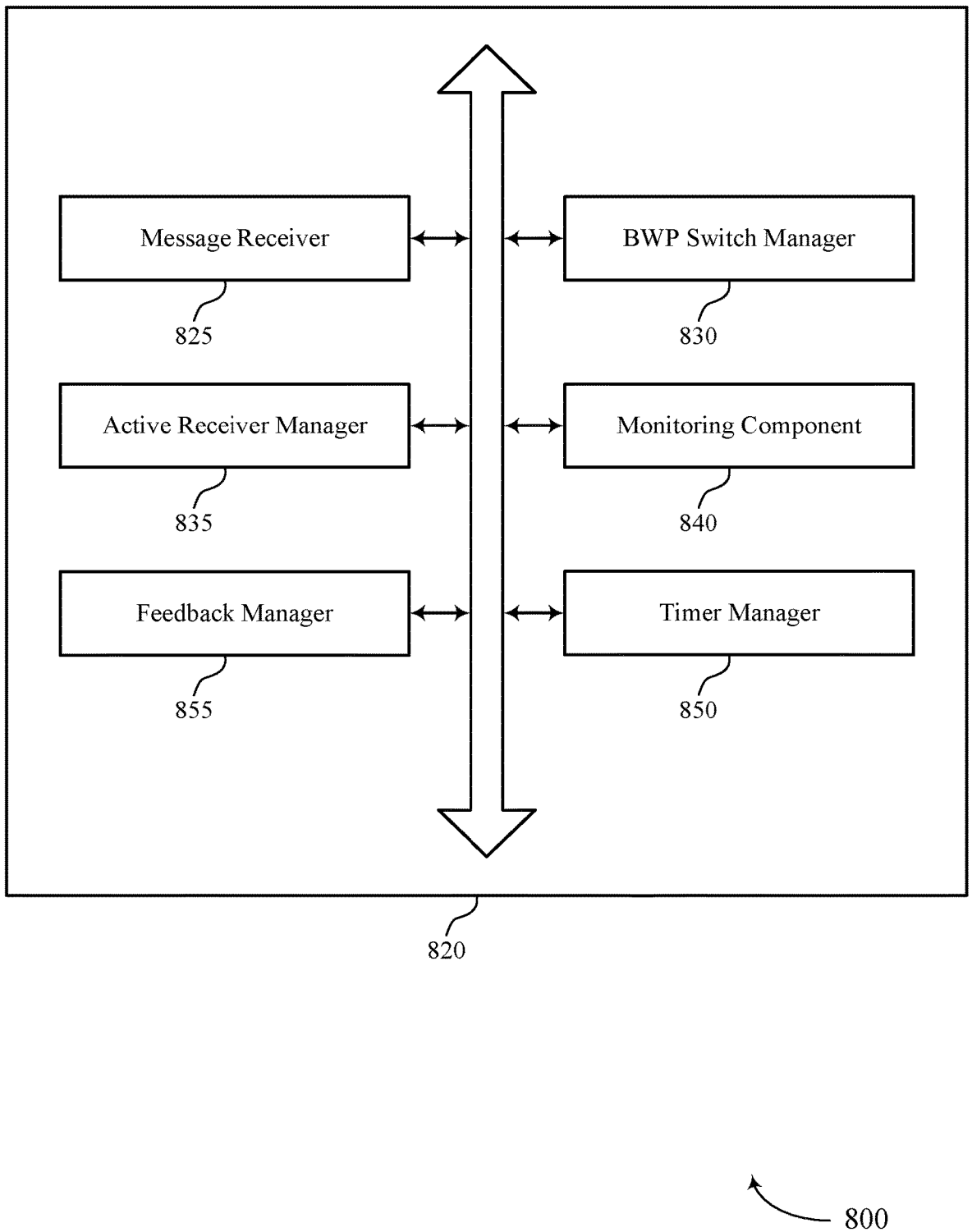
FIG. 8 shows a block diagram of a communications manager that supports receiver adjustment for wireless communication in accordance with aspects of the present disclosure.

FIG. 8 shows a block diagram 800 of a communications manager 820 that supports receiver adjustment for wireless communication in accordance with aspects of the present disclosure. The communications manager 820 may be an example of aspects of a communications manager 620, a communications manager 720, or both, as described herein. The communications manager 820, or various components thereof, may be an example of means for performing various aspects of receiver adjustment for wireless communication as described herein. For example, the communications manager 820 may include a message receiver 825, a BWP switch manager 830, an active receiver manager 835, a monitoring component 840, a timer manager 850, a feedback manager 855, or any combination thereof. Each of these components may communicate, directly or indirectly, with one another (e.g., via one or more buses).

The communications manager 820 may support wireless communication at a UE in accordance with examples as disclosed herein. The message receiver 825 may be configured as or otherwise support a means for receiving, from a base station, an activation message for a second BWP of a set of multiple BWPs configured for the UE. The BWP switch manager 830 may be configured as or otherwise support a means for switching from operating in a first BWP to operating in the second BWP based on the activation message for the second BWP. The active receiver manager 835 may be configured as or otherwise support a means for adjusting a quantity of active receivers at the UE based on switching from operating in the first BWP to operating in the second BWP.

In some examples, the monitoring component 840 may be configured as or otherwise support a means for monitoring for one or more downlink grants from the base station while operating in the second BWP, where adjusting the quantity of active receivers at the UE is based on monitoring for the one or more downlink grants from the base station.

In some examples, the timer manager 850 may be configured as or otherwise support a means for activating a timer based on switching from operating in the first BWP to operating in the second BWP, where monitoring for the one or more downlink grants from the base station is based on the timer.

In some examples, a bandwidth associated with the second BWP is greater than a threshold. In some examples, adjusting the quantity of active receivers at the UE is based on the bandwidth associated with the second BWP being greater than the threshold.

In some examples, the monitoring component 840 may be configured as or otherwise support a means for failing to detect one or more downlink grants from the base station while operating in the second BWP. In some examples, to adjust the quantity of active receivers at the UE, the active receiver manager 835 may be configured as or otherwise support a means for decreasing the quantity of active receivers at the UE from a first quantity of active receivers to a second quantity of active receivers based on failing to detect the one or more downlink grants from the base station.

In some examples, the feedback manager 855 may be configured as or otherwise support a means for transmitting, to the base station and before decreasing the quantity of active receivers at the UE, signaling based on the second quantity of active receivers.

In some examples, to support transmitting the signaling based on the second quantity of active receivers, the feedback manager 855 may be configured as or otherwise support a means for transmitting CSF, an SRS, or both to the base station according to a format associated with the second quantity of active receivers.

In some examples, the timer manager 850 may be configured as or otherwise support a means for activating a timer based on transmitting the signaling, where decreasing the quantity of active receivers at the UE from the first quantity of active receivers to the second quantity of active receivers occurs based on expiration of the timer.

In some examples, the timer manager 850 may be configured as or otherwise support a means for activating a second timer based on whether one or more second downlink grants are detected during a duration associated with the timer, where decreasing the quantity of active receivers at the UE occurs based on expiration of the timer and the second timer.

In some examples, the monitoring component 840 may be configured as or otherwise support a means for detecting one or more second downlink grants from the base station while operating in the second BWP and after decreasing the quantity of active receivers from the first quantity of active receivers to the second quantity of active receivers. In some examples, the active receiver manager 835 may be configured as or otherwise support a means for increasing the quantity of active receivers at the UE from the second quantity of active receivers to a third quantity of active receivers based on detecting the one or more second downlink grants from the base station.

In some examples, to support adjusting the quantity of active receivers at the UE, the active receiver manager 835 may be configured as or otherwise support a means for decreasing the quantity of active receivers at the UE from a first quantity of active receivers to a second quantity of active receivers based on the bandwidth associated with the second BWP being below the threshold.

In some examples, the feedback manager 855 may be configured as or otherwise support a means for transmitting, to the base station and before decreasing the quantity of active receivers at the UE, signaling based on the second quantity of active receivers.

In some examples, to support transmitting the signaling based on the second quantity of active receivers, the feedback manager 855 may be configured as or otherwise support a means for transmitting CSF, an SRS, or both to the base station according to a format associated with the second quantity of active receivers.

In some examples, the timer manager 850 may be configured as or otherwise support a means for activating a timer based on transmitting the signaling, where decreasing the quantity of active receivers from the first quantity of active receivers to the second quantity of active receivers occurs based on expiration of the timer.

In some examples, the timer manager 850 may be configured as or otherwise support a means for activating a second timer based on whether or not one or more second downlink grants are detected during a duration associated with the timer, where decreasing the quantity of active receivers at the UE occurs based on expiration of the timer and the second timer.

In some examples, to support adjusting the quantity of active receivers at the UE, the active receiver manager 835 may be configured as or otherwise support a means for decreasing the quantity of active receivers at the UE from a first quantity of active receivers to a second quantity of active receivers, where the method further includes. In some examples, to support adjusting the quantity of active receivers at the UE, the monitoring component 840 may be configured as or otherwise support a means for detecting one or more downlink grants from the base station scheduling communications associated with the first quantity of active receivers. In some examples, to support adjusting the quantity of active receivers at the UE, the active receiver manager 835 may be configured as or otherwise support a means for increasing the quantity of active receivers from the second quantity of active receivers to the first quantity of active receivers for a period of time based on detecting the one or more downlink grants. In some examples, to support adjusting the quantity of active receivers at the UE, the active receiver manager 835 may be configured as or otherwise support a means for decreasing the quantity of active receivers from the first quantity of active receivers to the second quantity of active receivers after the period of time.

Additionally or alternatively, the communications manager 820 may support wireless communication at a UE in accordance with examples as disclosed herein. In some examples, the message receiver 825 may be configured as or otherwise support a means for receiving, from a base station, an activation message for a BWP of a set of multiple BWPs configured for the UE. The monitoring component 840 may be configured as or otherwise support a means for monitoring for one or more downlink grants while operating in the BWP, the one or more downlink grants for receiving one or more downlink signals in the active BWP. In some examples, the active receiver manager 835 may be configured as or otherwise support a means for adjusting a quantity of active receivers at the UE based on whether the one or more downlink grants are detected.

In some examples, the monitoring component 840 may be configured as or otherwise support a means for failing to detect one or more downlink grants from the base station while operating in the BWP. In some examples, to adjust the quantity of active receivers at the UE, the active receiver manager 835 may be configured as or otherwise support a means for decreasing the quantity of active receivers at the UE from a first quantity of active receivers to a second quantity of active receivers based on failing to detect the one or more downlink grants from the base station.

In some examples, the feedback manager 855 may be configured as or otherwise support a means for transmitting, to the base station and before decreasing the quantity of active receivers at the UE, signaling based on the second quantity of active receivers.

In some examples, to support transmitting the signaling based on the second quantity of active receivers, the feedback manager 855 may be configured as or otherwise support a means for transmitting CSF, an SRS, or both to the base station according to a format associated with the second quantity of active receivers.

In some examples, the timer manager 850 may be configured as or otherwise support a means for activating a timer based on transmitting the signaling, where decreasing the quantity of active receivers at the UE from the first quantity of active receivers to the second quantity of active receivers occurs based on expiration of the timer.

In some examples, the timer manager 850 may be configured as or otherwise support a means for activating a second timer based on whether or not one or more second downlink grants are detected during a duration associated with the timer, where decreasing the quantity of active receivers at the UE occurs based on expiration of the timer and the second timer.

In some examples, the monitoring component 840 may be configured as or otherwise support a means for detecting one or more second downlink grants from the base station while operating in the BWP and after decreasing the quantity of active receivers from the first quantity of active receivers to the second quantity of active receivers. In some examples, the active receiver manager 835 may be configured as or otherwise support a means for increasing the quantity of active receivers at the UE from the second quantity of active receivers to a third quantity of active receivers based on detecting the one or more second downlink grants from the base station.

In some examples, to support adjusting the quantity of active receivers at the UE, the active receiver manager 835 may be configured as or otherwise support a means for decreasing the quantity of active receivers at the UE from a first quantity of active receivers to a second quantity of active receivers, where the method further includes. In some examples, to support adjusting the quantity of active receivers at the UE, the monitoring component 840 may be configured as or otherwise support a means for detecting one or more downlink grants from the base station scheduling communications associated with the first quantity of active receivers. In some examples, to support adjusting the quantity of active receivers at the UE, the active receiver manager 835 may be configured as or otherwise support a means for increasing the quantity of active receivers from the second quantity of active receivers to the first quantity of active receivers for a period of time based on detecting the one or more downlink grants. In some examples, to support adjusting the quantity of active receivers at the UE, the active receiver manager 835 may be configured as or otherwise support a means for decreasing the quantity of active receivers from the first quantity of active receivers to the second quantity of active receivers after the period of time.

In some examples, each BWP of the set of multiple BWPs has a same bandwidth.

Figure 9:
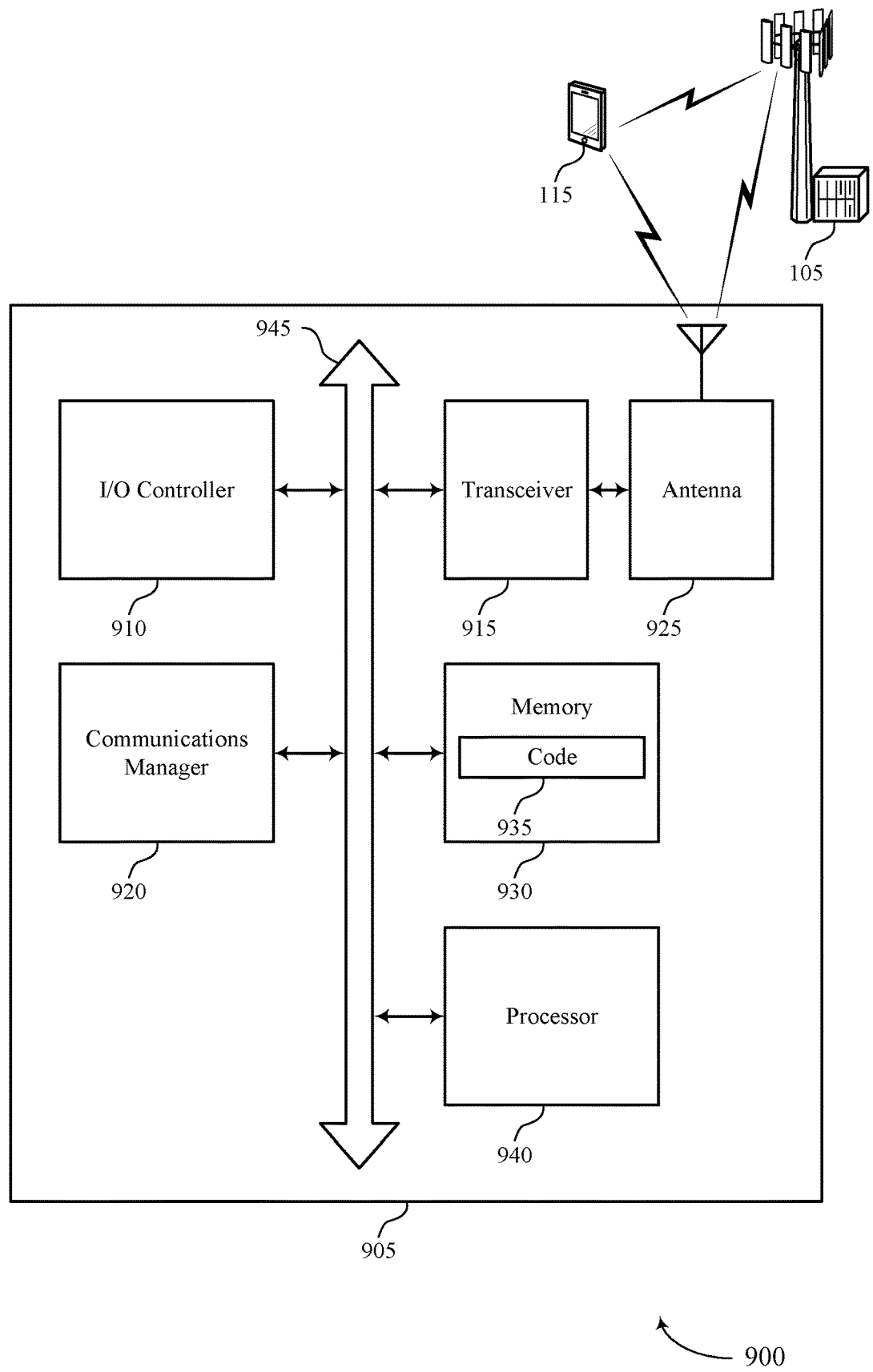
FIG. 9 shows a diagram of a system including a device that supports receiver adjustment for wireless communication in accordance with aspects of the present disclosure.

FIG. 9 shows a diagram of a system 900 including a device 905 that supports receiver adjustment for wireless communication in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of one or more transmitters 615, one or more transmitters 715, one or more receivers 610, one or more receivers 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting receiver adjustment for wireless communication). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a base station (e.g., via the transceiver 915), an activation message for a second BWP of a set of multiple BWPs configured for the UE. The communications manager 920 may be configured as or otherwise support a means for switching from operating in a first BWP to operating in the second BWP based on the activation message for the second BWP. The communications manager 920 may be configured as or otherwise support a means for adjusting a quantity of active receivers at the UE (e.g., a quantity of active receivers included in the transceiver 915) based on switching from operating in the first BWP to operating in the second BWP.

Additionally or alternatively, the communications manager 920 may support wireless communication at a UE in accordance with examples as disclosed herein. For example, the communications manager 920 may be configured as or otherwise support a means for receiving, from a base station (e.g., via the transceiver 915), an activation message for a BWP of a set of multiple BWPs configured for the UE. The communications manager 920 may be configured as or otherwise support a means for monitoring for one or more downlink grants while operating in the BWP, the one or more downlink grants for receiving one or more downlink signals in the active BWP. The communications manager 920 may be configured as or otherwise support a means for adjusting a quantity of active receivers at the UE (e.g., a quantity of active receivers included in the transceiver 915) based on whether the one or more downlink grants are detected.

By including or configuring the communications manager 920 in accordance with examples as described herein, the device 905 may support techniques for reduced power consumption.

In some examples, the communications manager 920 may be configured to perform various operations (e.g., receiving, monitoring, transmitting) using or otherwise in cooperation with the transceiver 915, the one or more antennas 925, or any combination thereof (e.g., the communications manager 920 may be configured to transmit or receive signals or messages described herein via the transceiver 915). Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of receiver adjustment for wireless communication as described herein, or the processor 940 and the memory 930 may be otherwise configured to perform or support such operations.

Figure 10:
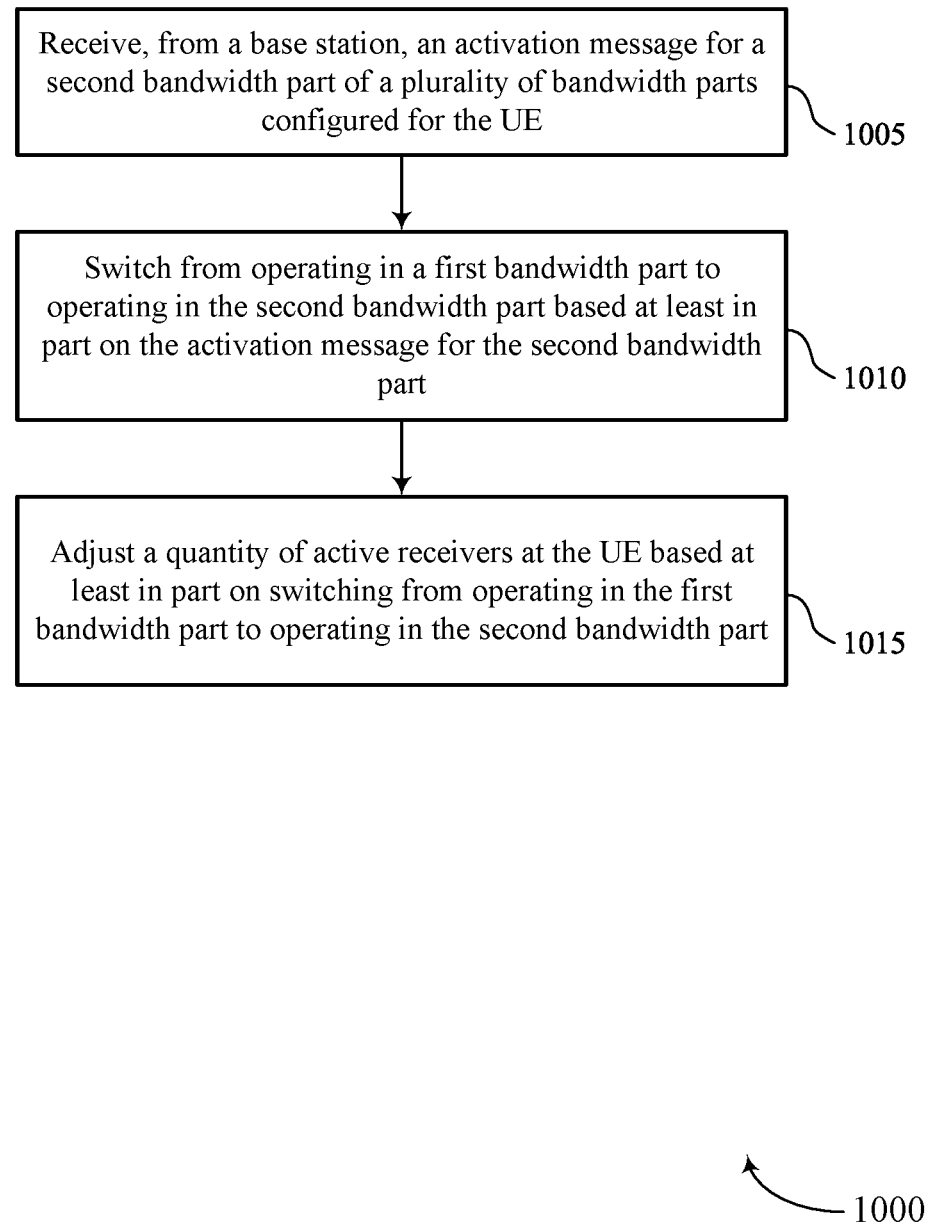
FIGS. 10 through 15 show flowcharts illustrating methods that support receiver adjustment for wireless communication in accordance with aspects of the present disclosure.

FIG. 10 shows a flowchart illustrating a method 1000 that supports receiver adjustment for wireless communication in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1005, the method may include receiving, from a base station, an activation message for a second BWP of a set of multiple BWPs configured for the UE. The operations of 1005 may be performed in accordance with examples as disclosed herein. In some examples, aspects of the operations of 1005 may be performed by a message receiver 825 as described with reference to FIG. 8. Additionally or alternatively, means for performing 1005 may, but not necessarily, include, for example, antenna 925, transceiver 915, communications manager 920, memory 930 (including code 935), processor 940 and/or bus 945.

At 1010, the method may include switching from operating in a first BWP to operating in the second BWP based on the activation message for the second BWP. The operations of 1010 may be performed in accordance with examples as disclosed herein. In some examples, aspects of the operations of 1010 may be performed by a BWP switch manager 830 as described with reference to FIG. 8. Additionally or alternatively, means for performing 1010 may, but not necessarily, include, for example, antenna 925, transceiver 915, communications manager 920, memory 930 (including code 935), processor 940 and/or bus 945.

At 1015, the method may include adjusting a quantity of active receivers at the UE based on switching from operating in the first BWP to operating in the second BWP. The operations of 1015 may be performed in accordance with examples as disclosed herein. In some examples, aspects of the operations of 1015 may be performed by an active receiver manager 835 as described with reference to FIG. 8. Additionally or alternatively, means for performing 1015 may, but not necessarily, include, for example, antenna 925, transceiver 915, communications manager 920, memory 930 (including code 935), processor 940 and/or bus 945.

Figure 11:
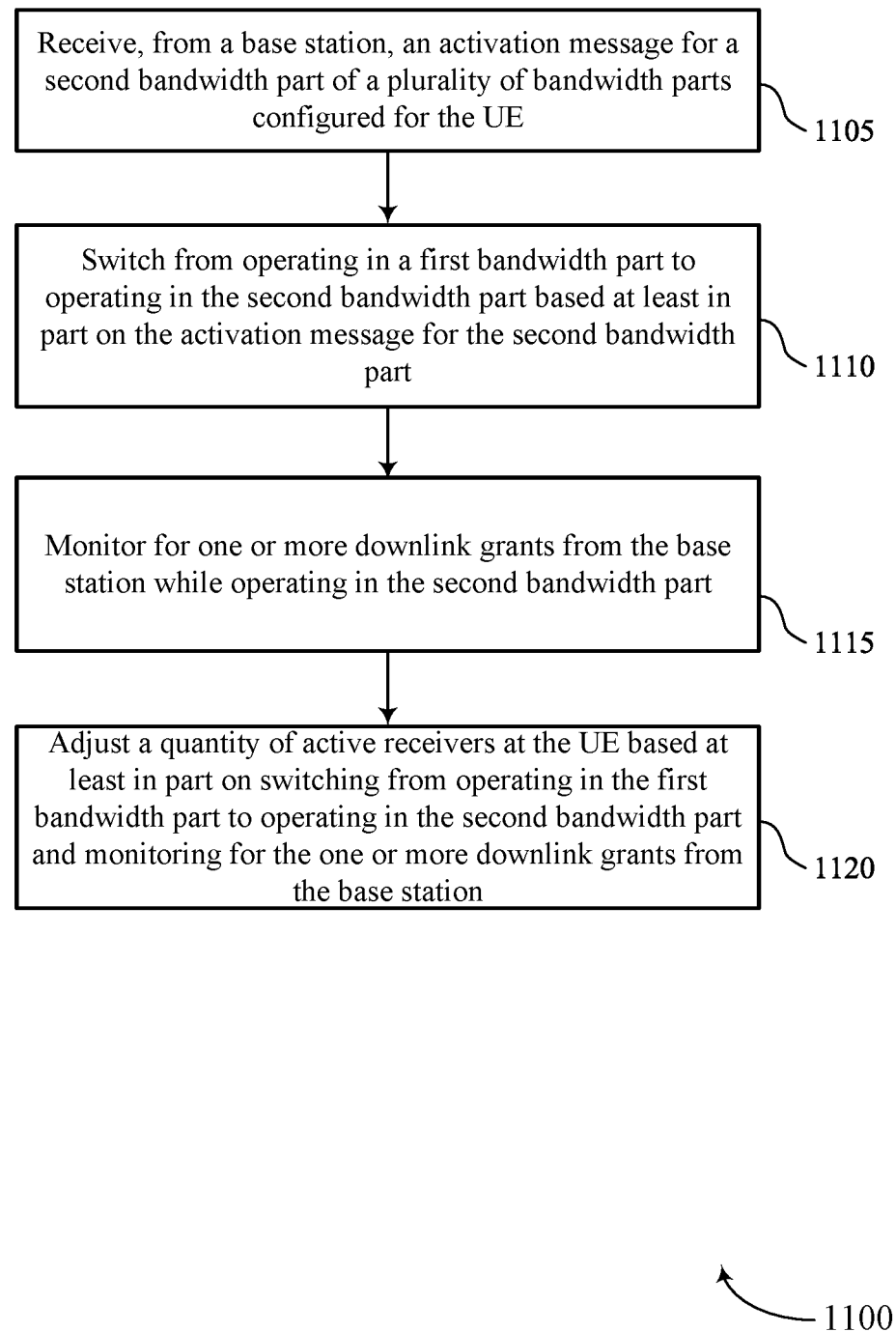

FIG. 11 shows a flowchart illustrating a method 1100 that supports receiver adjustment for wireless communication in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1105, the method may include receiving, from a base station, an activation message for a second BWP of a set of multiple BWPs configured for the UE. The operations of 1105 may be performed in accordance with examples as disclosed herein. In some examples, aspects of the operations of 1105 may be performed by a message receiver 825 as described with reference to FIG. 8. Additionally or alternatively, means for performing 1105 may, but not necessarily, include, for example, antenna 925, transceiver 915, communications manager 920, memory 930 (including code 935), processor 940 and/or bus 945.

At 1110, the method may include switching from operating in a first BWP to operating in the second BWP based on the activation message for the second BWP. The operations of 1110 may be performed in accordance with examples as disclosed herein. In some examples, aspects of the operations of 1110 may be performed by a BWP switch manager 830 as described with reference to FIG. 8. Additionally or alternatively, means for performing 1110 may, but not necessarily, include, for example, antenna 925, transceiver 915, communications manager 920, memory 930 (including code 935), processor 940 and/or bus 945.

At 1115, the method may include monitoring for one or more downlink grants from the base station while operating in the second BWP. The operations of 1115 may be performed in accordance with examples as disclosed herein. In some examples, aspects of the operations of 1115 may be performed by a monitoring component 840 as described with reference to FIG. 8. Additionally or alternatively, means for performing 1115 may, but not necessarily, include, for example, antenna 925, transceiver 915, communications manager 920, memory 930 (including code 935), processor 940 and/or bus 945.

At 1120, the method may include adjusting a quantity of active receivers at the UE based on switching from operating in the first BWP to operating in the second BWP and monitoring for the one or more downlink grants from the base station. The operations of 1120 may be performed in accordance with examples as disclosed herein. In some examples, aspects of the operations of 1120 may be performed by an active receiver manager 835 as described with reference to FIG. 8. Additionally or alternatively, means for performing 1120 may, but not necessarily, include, for example, antenna 925, transceiver 915, communications manager 920, memory 930 (including code 935), processor 940 and/or bus 945.

Figure 12:
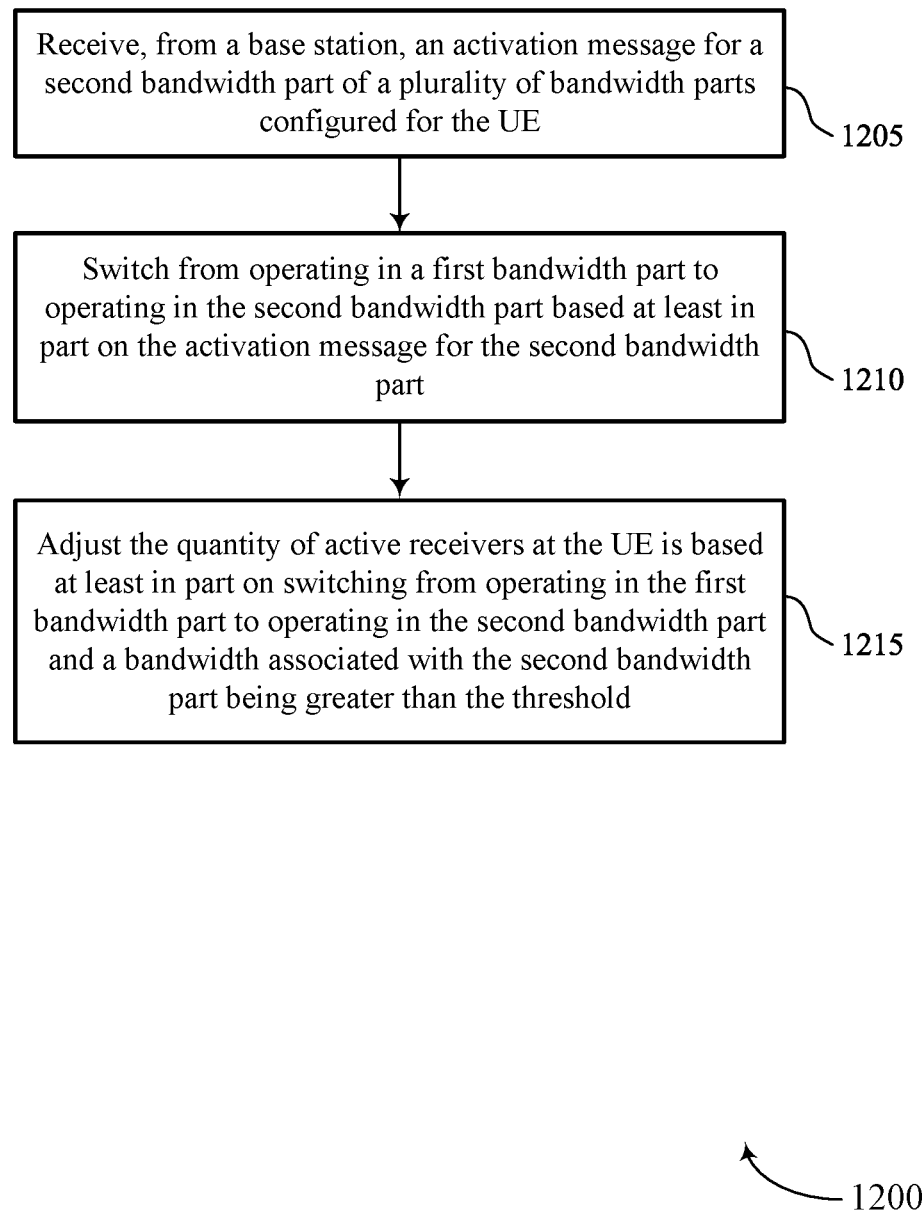

FIG. 12 shows a flowchart illustrating a method 1200 that supports receiver adjustment for wireless communication in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, an activation message for a second BWP of a set of multiple BWPs configured for the UE. The operations of 1205 may be performed in accordance with examples as disclosed herein. In some examples, aspects of the operations of 1205 may be performed by a message receiver 825 as described with reference to FIG. 8. Additionally or alternatively, means for performing 1205 may, but not necessarily, include, for example, antenna 925, transceiver 915, communications manager 920, memory 930 (including code 935), processor 940 and/or bus 945.

At 1210, the method may include switching from operating in a first BWP to operating in the second BWP based on the activation message for the second BWP. The operations of 1210 may be performed in accordance with examples as disclosed herein. In some examples, aspects of the operations of 1210 may be performed by a BWP switch manager 830 as described with reference to FIG. 8. Additionally or alternatively, means for performing 1210 may, but not necessarily, include, for example, antenna 925, transceiver 915, communications manager 920, memory 930 (including code 935), processor 940 and/or bus 945.

At 1215, the method may include adjusting a quantity of active receivers at the UE based on switching from operating in the first BWP to operating in the second BWP and a bandwidth associated with the second BWP being greater than a threshold. The operations of 1215 may be performed in accordance with examples as disclosed herein. In some examples, aspects of the operations of 1215 may be performed by an active receiver manager 835 as described with reference to FIG. 8. Additionally or alternatively, means for performing 1215 may, but not necessarily, include, for example, antenna 925, transceiver 915, communications manager 920, memory 930 (including code 935), processor 940 and/or bus 945.

Figure 13:
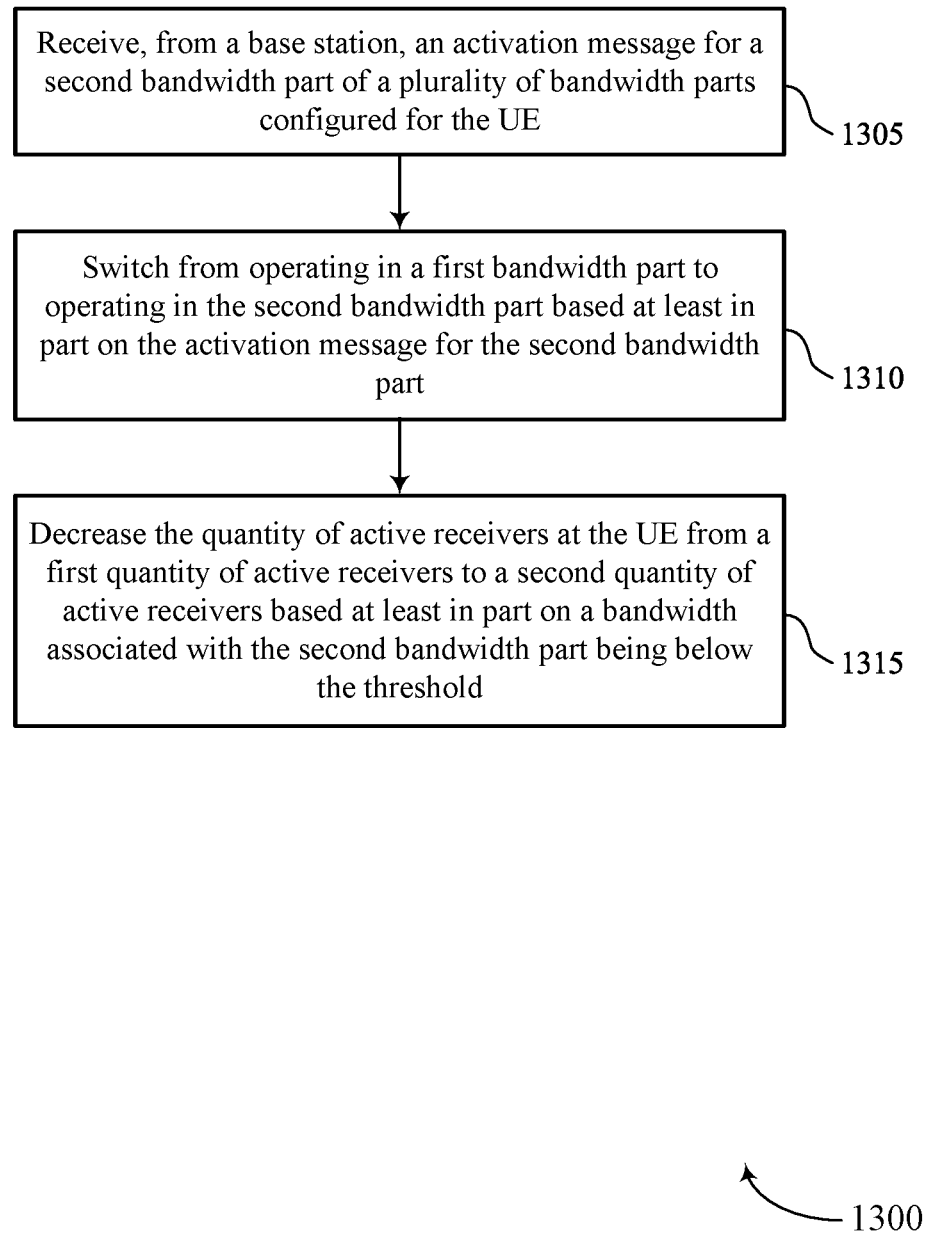

FIG. 13 shows a flowchart illustrating a method 1300 that supports receiver adjustment for wireless communication in accordance with aspects of the present disclosure. The operations of the method 1300 may be implemented by a UE or its components as described herein. For example, the operations of the method 1300 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, an activation message for a second BWP of a set of multiple BWPs configured for the UE. The operations of 1305 may be performed in accordance with examples as disclosed herein. In some examples, aspects of the operations of 1305 may be performed by a message receiver 825 as described with reference to FIG. 8. Additionally or alternatively, means for performing 1305 may, but not necessarily, include, for example, antenna 925, transceiver 915, communications manager 920, memory 930 (including code 935), processor 940 and/or bus 945.

At 1310, the method may include switching from operating in a first BWP to operating in the second BWP based on the activation message for the second BWP. The operations of 1310 may be performed in accordance with examples as disclosed herein. In some examples, aspects of the operations of 1310 may be performed by a BWP switch manager 830 as described with reference to FIG. 8. Additionally or alternatively, means for performing 1310 may, but not necessarily, include, for example, antenna 925, transceiver 915, communications manager 920, memory 930 (including code 935), processor 940 and/or bus 945.

At 1315, the method may include decreasing the quantity of active receivers at the UE from a first quantity of active receivers to a second quantity of active receivers based on a bandwidth associated with the second BWP being below the threshold. The operations of 1315 may be performed in accordance with examples as disclosed herein. In some examples, aspects of the operations of 1320 may be performed by an active receiver manager 835 as described with reference to FIG. 8. Additionally or alternatively, means for performing 1315 may, but not necessarily, include, for example, antenna 925, transceiver 915, communications manager 920, memory 930 (including code 935), processor 940 and/or bus 945.

Figure 14:
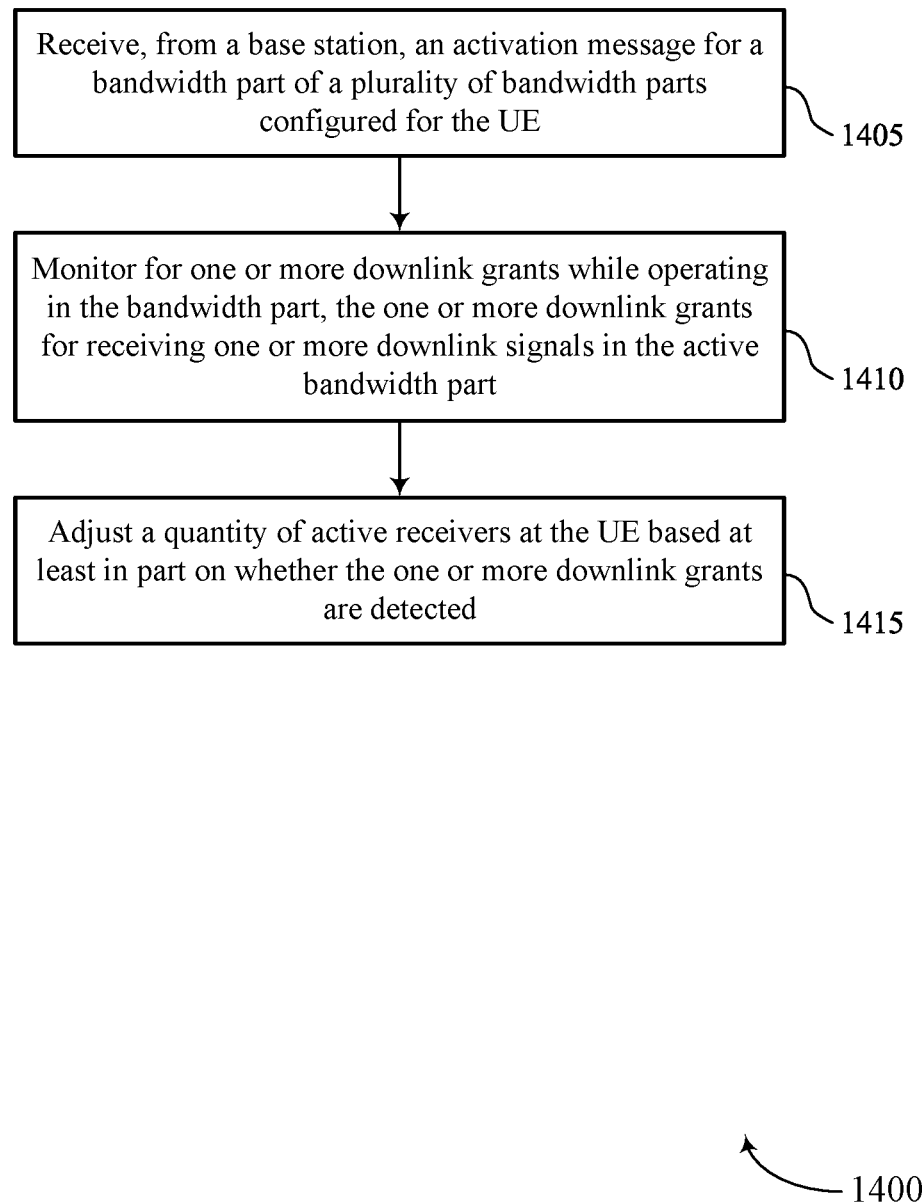

FIG. 14 shows a flowchart illustrating a method 1400 that supports receiver adjustment for wireless communication in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, an activation message for a BWP of a set of multiple BWPs configured for the UE. The operations of 1405 may be performed in accordance with examples as disclosed herein. In some examples, aspects of the operations of 1405 may be performed by a message receiver 825 as described with reference to FIG. 8. Additionally or alternatively, means for performing 1405 may, but not necessarily, include, for example, antenna 925, transceiver 915, communications manager 920, memory 930 (including code 935), processor 940 and/or bus 945.

At 1410, the method may include monitoring for one or more downlink grants while operating in the BWP, the one or more downlink grants for receiving one or more downlink signals in the active BWP. The operations of 1410 may be performed in accordance with examples as disclosed herein. In some examples, aspects of the operations of 1410 may be performed by a monitoring component 840 as described with reference to FIG. 8. Additionally or alternatively, means for performing 1410 may, but not necessarily, include, for example, antenna 925, transceiver 915, communications manager 920, memory 930 (including code 935), processor 940 and/or bus 945.

At 1415, the method may include adjusting a quantity of active receivers at the UE based on whether the one or more downlink grants are detected. The operations of 1415 may be performed in accordance with examples as disclosed herein. In some examples, aspects of the operations of 1415 may be performed by an active receiver manager 835 as described with reference to FIG. 8. Additionally or alternatively, means for performing 1415 may, but not necessarily, include, for example, antenna 925, transceiver 915, communications manager 920, memory 930 (including code 935), processor 940 and/or bus 945.

Figure 15:
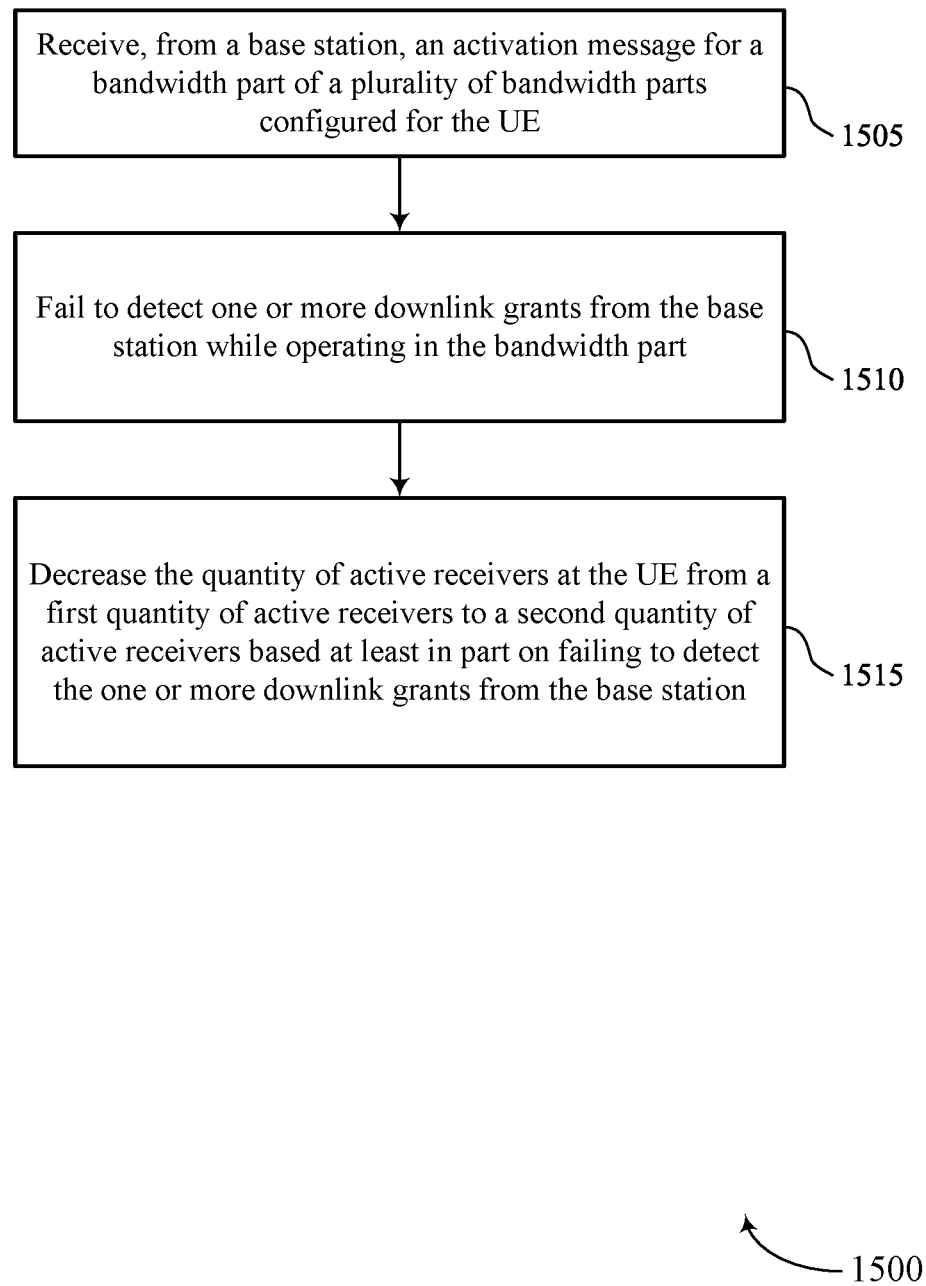

FIG. 15 shows a flowchart illustrating a method 1500 that supports receiver adjustment for wireless communication in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, an activation message for a BWP of a set of multiple BWPs configured for the UE. The operations of 1505 may be performed in accordance with examples as disclosed herein. In some examples, aspects of the operations of 1505 may be performed by a message receiver 825 as described with reference to FIG. 8. Additionally or alternatively, means for performing 1505 may, but not necessarily, include, for example, antenna 925, transceiver 915, communications manager 920, memory 930 (including code 935), processor 940 and/or bus 945.

At 1510, the method may include failing to detect one or more downlink grants from the base station while operating in the BWP. The operations of 1515 may be performed in accordance with examples as disclosed herein. In some examples, aspects of the operations of 1510 may be performed by a monitoring component 840 as described with reference to FIG. 8. Additionally or alternatively, means for performing 1510 may, but not necessarily, include, for example, antenna 925, transceiver 915, communications manager 920, memory 930 (including code 935), processor 940 and/or bus 945.

At 1515, the method may include decreasing the quantity of active receivers at the UE from a first quantity of active receivers to a second quantity of active receivers based on failing to detect the one or more downlink grants from the base station. The operations of 1520 may be performed in accordance with examples as disclosed herein. In some examples, aspects of the operations of 1515 may be performed by an active receiver manager 835 as described with reference to FIG. 8. Additionally or alternatively, means for performing 1515 may, but not necessarily, include, for example, antenna 925, transceiver 915, communications manager 920, memory 930 (including code 935), processor 940 and/or bus 945.

The following provides an overview of aspects of the present disclosure:

Aspect 1: A method for wireless communication at a UE, comprising: receiving, from a base station, an activation message for a second BWP of a plurality of BWPs configured for the UE; switching from operating in a first BWP to operating in the second BWP based at least in part on the activation message for the second BWP; and adjusting a quantity of active receivers at the UE based at least in part on switching from operating in the first BWP to operating in the second BWP.

Aspect 2: The method of aspect 1, further comprising: monitoring for one or more downlink grants from the base station while operating in the second BWP, wherein adjusting the quantity of active receivers at the UE is based at least in part on monitoring for the one or more downlink grants from the base station.

Aspect 3: The method of aspect 2, further comprising: activating a timer based at least in part on switching from operating in the first BWP to operating in the second BWP, wherein monitoring for the one or more downlink grants from the base station is based at least in part on the timer.

Aspect 4: The method of any of aspects 1 through 3, wherein a bandwidth associated with the second BWP is greater than a threshold; and adjusting the quantity of active receivers at the UE is based at least in part on the bandwidth associated with the second BWP being greater than the threshold.

Aspect 5: The method of aspect 4, further comprising: failing to detect one or more downlink grants from the base station while operating in the second BWP, wherein adjusting the quantity of active receivers at the UE comprises: decreasing the quantity of active receivers at the UE from a first quantity of active receivers to a second quantity of active receivers based at least in part on failing to detect the one or more downlink grants from the base station.

Aspect 6: The method of aspect 5, further comprising: transmitting, to the base station and before decreasing the quantity of active receivers at the UE, signaling based at least in part on the second quantity of active receivers.

Aspect 7: The method of aspect 6, wherein transmitting the signaling based at least in part on the second quantity of active receivers comprises: transmitting CSF, an SRS, or both to the base station according to a format associated with the second quantity of active receivers.

Aspect 8: The method of any of aspects 6 through 7, further comprising: activating a timer based on transmitting the signaling, wherein decreasing the quantity of active receivers at the UE from the first quantity of active receivers to the second quantity of active receivers occurs based at least in part on expiration of the timer.

Aspect 9: The method of aspect 8, further comprising: activating a second timer based on whether one or more second downlink grants are detected during a duration associated with the timer, wherein decreasing the quantity of active receivers at the UE occurs based at least in part on expiration of the timer and the second timer.

Aspect 10: The method of any of aspects 5 through 9, further comprising: detecting one or more second downlink grants from the base station while operating in the second BWP and after decreasing the quantity of active receivers from the first quantity of active receivers to the second quantity of active receivers; and increasing the quantity of active receivers at the UE from the second quantity of active receivers to a third quantity of active receivers based at least in part on detecting the one or more second downlink grants from the base station.

Aspect 11: The method of any of aspects 1 through 3, wherein a bandwidth associated with the second BWP is below a threshold, and wherein adjusting the quantity of active receivers at the UE comprises: decreasing the quantity of active receivers at the UE from a first quantity of active receivers to a second quantity of active receivers based at least in part on the bandwidth associated with the second BWP being below the threshold.

Aspect 12: The method of aspect 11, further comprising: transmitting, to the base station and before decreasing the quantity of active receivers at the UE, signaling based at least in part on the second quantity of active receivers.

Aspect 13: The method of aspect 12, wherein transmitting the signaling based at least in part on the second quantity of active receivers comprises: transmitting CSF, an SRS, or both to the base station according to a format associated with the second quantity of active receivers.

Aspect 14: The method of any of aspects 12 through 13, further comprising: activating a timer based on transmitting the signaling, wherein decreasing the quantity of active receivers from the first quantity of active receivers to the second quantity of active receivers occurs based at least in part on expiration of the timer.

Aspect 15: The method of aspect 14, further comprising: activating a second timer based on whether or not one or more second downlink grants are detected during a duration associated with the timer, wherein decreasing the quantity of active receivers at the UE occurs based at least in part on expiration of the timer and the second timer.

Aspect 16: The method of any of aspects 1 through 15, wherein adjusting the quantity of active receivers at the UE comprises: decreasing the quantity of active receivers at the UE from a first quantity of active receivers to a second quantity of active receivers, wherein the method further comprises: detecting one or more downlink grants from the base station scheduling communications associated with the first quantity of active receivers; increasing the quantity of active receivers from the second quantity of active receivers to the first quantity of active receivers for a period of time based at least in part on detecting the one or more downlink grants; and decreasing the quantity of active receivers from the first quantity of active receivers to the second quantity of active receivers after the period of time.

Aspect 17: A method for wireless communication at a UE, comprising: receiving, from a base station, an activation message for a BWP of a plurality of BWPs configured for the UE; monitoring for one or more downlink grants while operating in the BWP, the one or more downlink grants for receiving one or more downlink signals in the active BWP; and adjusting a quantity of active receivers at the UE based at least in part on whether the one or more downlink grants are detected.

Aspect 18: The method of aspect 17, further comprising: failing to detect one or more downlink grants from the base station while operating in the BWP, wherein adjusting the quantity of active receivers at the UE comprises: decreasing the quantity of active receivers at the UE from a first quantity of active receivers to a second quantity of active receivers based at least in part on failing to detect the one or more downlink grants from the base station.

Aspect 19: The method of aspect 18, further comprising: transmitting, to the base station and before decreasing the quantity of active receivers at the UE, signaling based at least in part on the second quantity of active receivers.

Aspect 20: The method of aspect 19, wherein transmitting the signaling based at least in part on the second quantity of active receivers comprises: transmitting CSF, an SRS, or both to the base station according to a format associated with the second quantity of active receivers.

Aspect 21: The method of any of aspects 19 through 20, further comprising: activating a timer based on transmitting the signaling, wherein decreasing the quantity of active receivers at the UE from the first quantity of active receivers to the second quantity of active receivers occurs based at least in part on expiration of the timer.

Aspect 22: The method of aspect 21, further comprising: activating a second timer based on whether or not one or more second downlink grants are detected during a duration associated with the timer, wherein decreasing the quantity of active receivers at the UE occurs based at least in part on expiration of the timer and the second timer.

Aspect 23: The method of any of aspects 18 through 22, further comprising: detecting one or more second downlink grants from the base station while operating in the BWP and after decreasing the quantity of active receivers from the first quantity of active receivers to the second quantity of active receivers; and increasing the quantity of active receivers at the UE from the second quantity of active receivers to a third quantity of active receivers based at least in part on detecting the one or more second downlink grants from the base station.

Aspect 24: The method of any of aspects 17 through 23, wherein adjusting the quantity of active receivers at the UE comprises: decreasing the quantity of active receivers at the UE from a first quantity of active receivers to a second quantity of active receivers, wherein the method further comprises: detecting one or more downlink grants from the base station scheduling communications associated with the first quantity of active receivers; increasing the quantity of active receivers from the second quantity of active receivers to the first quantity of active receivers for a period of time based at least in part on detecting the one or more downlink grants; and decreasing the quantity of active receivers from the first quantity of active receivers to the second quantity of active receivers after the period of time.

Aspect 25: The method of any of aspects 17 through 24, wherein each BWP of the plurality of BWPs has a same bandwidth.

Aspect 26: An apparatus for wireless communication at a UE, comprising a processor; a transceiver coupled with the processor and comprising a plurality of receivers; and memory coupled with the processor; the memory and the processor configured to cause the apparatus to perform a method of any of aspects 1 through 16.

Aspect 27: An apparatus for wireless communication at a UE, comprising at least one means for performing a method of any of aspects 1 through 16.

Aspect 28: A non-transitory computer-readable medium storing code for wireless communication at a UE, the code comprising instructions executable by a processor to perform a method of any of aspects 1 through 16.

Aspect 29: An apparatus for wireless communication at a UE, comprising a processor; a transceiver coupled with the processor and comprising a plurality of receivers; and memory coupled with the processor; the memory and the processor configured to cause the apparatus to perform a method of any of aspects 17 through 25.

Aspect 30: An apparatus for wireless communication at a UE, comprising at least one means for performing a method of any of aspects 17 through 25.

Aspect 31: A non-transitory computer-readable medium storing code for wireless communication at a UE, the code comprising instructions executable by a processor to perform a method of any of aspects 17 through 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a network device, an activation message for a second bandwidth part of a plurality of bandwidth parts configured for the UE;
   switching from operating in a first bandwidth part to operating in the second bandwidth part based at least in part on the activation message for the second bandwidth part;
   comparing, based at least in part on switching from operating in the first bandwidth part to operating in the second bandwidth part, a bandwidth associated with the second bandwidth part to a threshold; and
   adjusting a quantity of active receivers at the UE based at least in part on the bandwidth associated with the second bandwidth part satisfying the threshold and further based at least in part on switching from operating in the first bandwidth part to operating in the second bandwidth part.

2. The method of claim 1, further comprising:
   monitoring for one or more downlink grants from the network device while operating in the second bandwidth part, wherein adjusting the quantity of active receivers at the UE is based at least in part on monitoring for the one or more downlink grants from the network device.

3. The method of claim 2, further comprising:
   activating a timer based at least in part on switching from operating in the first bandwidth part to operating in the second bandwidth part, wherein monitoring for the one or more downlink grants from the network device is based at least in part on the timer.

4. The method of claim 1, wherein:
   the bandwidth associated with the second bandwidth part is greater than the threshold; and
   adjusting the quantity of active receivers at the UE is based at least in part on the bandwidth associated with the second bandwidth part being greater than the threshold.

5. The method of claim 4, further comprising:
   failing to detect one or more downlink grants from the network device while operating in the second bandwidth part, wherein adjusting the quantity of active receivers at the UE comprises:
      decreasing the quantity of active receivers at the UE from a first quantity of active receivers to a second quantity of active receivers based at least in part on failing to detect the one or more downlink grants from the network device.

6. The method of claim 5, further comprising:
   transmitting, to the network device and before decreasing the quantity of active receivers at the UE, signaling based at least in part on the second quantity of active receivers.

7. The method of claim 6, wherein transmitting the signaling based at least in part on the second quantity of active receivers comprises:
   transmitting channel state feedback, a sounding reference signal, or both to the network device according to a format associated with the second quantity of active receivers.

8. The method of claim 6, further comprising:
   activating a timer based on transmitting the signaling, wherein decreasing the quantity of active receivers at the UE from the first quantity of active receivers to the second quantity of active receivers occurs based at least in part on expiration of the timer.

9. The method of claim 8, further comprising:
   activating a second timer based on whether one or more second downlink grants are detected during a duration associated with the timer, wherein decreasing the quantity of active receivers at the UE occurs based at least in part on expiration of the timer and the second timer.

10. The method of claim 5, further comprising:
    detecting one or more second downlink grants from the network device while operating in the second bandwidth part and after decreasing the quantity of active receivers from the first quantity of active receivers to the second quantity of active receivers; and
    increasing the quantity of active receivers at the UE from the second quantity of active receivers to a third quantity of active receivers based at least in part on detecting the one or more second downlink grants from the network device.

11. The method of claim 1, wherein the bandwidth associated with the second bandwidth part is below the threshold, and wherein adjusting the quantity of active receivers at the UE comprises:
    decreasing the quantity of active receivers at the UE from a first quantity of active receivers to a second quantity of active receivers based at least in part on the bandwidth associated with the second bandwidth part being below the threshold.

12. The method of claim 11, further comprising:
    transmitting, to the network device and before decreasing the quantity of active receivers at the UE, signaling based at least in part on the second quantity of active receivers.

13. The method of claim 12, wherein transmitting the signaling based at least in part on the second quantity of active receivers comprises:
    transmitting channel state feedback, a sounding reference signal, or both to the network device according to a format associated with the second quantity of active receivers.

14. The method of claim 12, further comprising:
activating a timer based on transmitting the signaling, wherein decreasing the quantity of active receivers from the first quantity of active receivers to the second quantity of active receivers occurs based at least in part on expiration of the timer.

15. The method of claim 14, further comprising:
activating a second timer based on whether or not one or more second downlink grants are detected during a duration associated with the timer, wherein decreasing the quantity of active receivers at the UE occurs based at least in part on expiration of the timer and the second timer.

16. The method of claim 1, wherein adjusting the quantity of active receivers at the UE comprises:
decreasing the quantity of active receivers at the UE from a first quantity of active receivers to a second quantity of active receivers, wherein the method further comprises:
detecting one or more downlink grants from the network device scheduling communications associated with the first quantity of active receivers;
increasing the quantity of active receivers from the second quantity of active receivers to the first quantity of active receivers for a period of time based at least in part on detecting the one or more downlink grants; and
decreasing the quantity of active receivers from the first quantity of active receivers to the second quantity of active receivers after the period of time.

17. A method for wireless communication at a user equipment (UE), comprising:
receiving, from a network device, an activation message for a bandwidth part of a plurality of bandwidth parts configured for the UE;
monitoring for one or more downlink grants while operating in the bandwidth part, the one or more downlink grants for receiving one or more downlink signals in the active bandwidth part;
failing to detect one or more downlink grants from the network device while operating in the bandwidth part; and
adjusting a quantity of active receivers at the UE based at least in part on whether the one or more downlink grants are detected, wherein adjusting the quantity of active receivers at the UE comprises:
decreasing the quantity of active receivers at the UE from a first quantity of active receivers to a second quantity of active receivers based at least in part on failing to detect the one or more downlink grants from the network device.

18. The method of claim 17, further comprising:
transmitting, to the network device and before decreasing the quantity of active receivers at the UE, signaling based at least in part on the second quantity of active receivers.

19. The method of claim 18, wherein transmitting the signaling based at least in part on the second quantity of active receivers comprises:
transmitting channel state feedback, a sounding reference signal, or both to the network device according to a format associated with the second quantity of active receivers.

20. The method of claim 18, further comprising:
activating a timer based on transmitting the signaling, wherein decreasing the quantity of active receivers at the UE from the first quantity of active receivers to the second quantity of active receivers occurs based at least in part on expiration of the timer.

21. The method of claim 20, further comprising:
activating a second timer based on whether or not one or more second downlink grants are detected during a duration associated with the timer, wherein decreasing the quantity of active receivers at the UE occurs based at least in part on expiration of the timer and the second timer.

22. The method of claim 17, further comprising:
detecting one or more second downlink grants from the network device while operating in the bandwidth part and after decreasing the quantity of active receivers from the first quantity of active receivers to the second quantity of active receivers; and
increasing the quantity of active receivers at the UE from the second quantity of active receivers to a third quantity of active receivers based at least in part on detecting the one or more second downlink grants from the network device.

23. The method of claim 17, further comprising:
detecting one or more downlink grants from the network device scheduling communications associated with the first quantity of active receivers;
increasing the quantity of active receivers from the second quantity of active receivers to the first quantity of active receivers for a period of time based at least in part on detecting the one or more downlink grants; and
decreasing the quantity of active receivers from the first quantity of active receivers to the second quantity of active receivers after the period of time.

24. The method of claim 17, wherein each bandwidth part of the plurality of bandwidth parts has a same bandwidth.

25. An apparatus for wireless communication comprising:
a processor of a user equipment (UE);
a transceiver coupled with the processor and comprising a plurality of receivers; and
and memory coupled with the processor, the memory and the processor configured to cause the apparatus to:
receive, from a network device via the transceiver, an activation message for a second bandwidth part of a plurality of bandwidth parts configured for the UE;
switch from operating in a first bandwidth part to operating in the second bandwidth part based at least in part on the activation message for the second bandwidth part;
compare, based at least in part on switching from operating in the first bandwidth part to operating in the second bandwidth part, a bandwidth associated with the second bandwidth part to a threshold; and
adjust a quantity of active receivers at the UE based at least in part on the bandwidth associated with the second bandwidth part satisfying the threshold and further based at least in part on switching from operating in the first bandwidth part to operating in the second bandwidth part.

26. The apparatus of claim 25, the memory and processor further configured to cause the apparatus to:
monitor for one or more downlink grants from the network device while operating in the second bandwidth part, wherein adjusting the quantity of active receivers at the UE is based at least in part on monitoring for the one or more downlink grants from the network device.

27. The apparatus of claim 25, wherein:
the bandwidth associated with the second bandwidth part is greater than the threshold; and the memory and processor are configured to cause the apparatus to adjust the quantity of active receivers based at least in part on the bandwidth associated with the second bandwidth part being greater than the threshold.

28. An apparatus for wireless communication comprising:
a processor of a user equipment (UE);
a transceiver coupled with the processor and comprising a plurality of receivers; and
memory coupled with the processor, the memory and the processor configured to cause the apparatus to:
  receive, from a network device via the transceiver, an activation message for a bandwidth part of a plurality of bandwidth parts configured for the UE;
  monitor for one or more downlink grants while operating in the bandwidth part, the one or more downlink grants for receiving one or more downlink signals in the active bandwidth part;
  fail to detect one or more downlink grants from the network device while operating in the bandwidth part; and
  adjust a quantity of active receivers included in the plurality of receivers based at least in part on whether the one or more downlink grants are detected, wherein, to adjust the quantity of active receivers, the memory and the processor are configured to cause the apparatus to:
    decrease the quantity of active receivers included in the plurality of receivers from a first quantity of active receivers to a second quantity of active receivers based at least in part on failing to detect the one or more downlink grants from the network device.

\* \* \* \* \*